(12) United States Patent
Shiozawa et al.

(10) Patent No.: US 8,639,412 B2
(45) Date of Patent: *Jan. 28, 2014

(54) ROAD SURFACE FRICTION COEFFICIENT ESTIMATING DEVICE AND ROAD SURFACE FRICTION COEFFICIENT ESTIMATING METHOD

(75) Inventors: Yuuki Shiozawa, Isehara (JP); Hiroshi Mouri, Isehara (JP); Masaaki Nawano, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 322 days.

This patent is subject to a terminal disclaimer.

(21) Appl. No.: 13/001,988

(22) PCT Filed: Jun. 26, 2009

(86) PCT No.: PCT/JP2009/061683
§ 371 (c)(1),
(2), (4) Date: Dec. 29, 2010

(87) PCT Pub. No.: WO2010/001819
PCT Pub. Date: Jan. 7, 2010

(65) Prior Publication Data
US 2011/0118935 A1    May 19, 2011

(30) Foreign Application Priority Data
Jun. 30, 2008  (JP) .................................. 2008-171510

(51) Int. Cl.
*B60K 37/06*    (2006.01)
(52) U.S. Cl.
USPC .............................. 701/35; 303/149; 303/155

(58) Field of Classification Search
USPC ............... 701/35; 702/35; 73/146, 146.5, 104
See application file for complete search history.

(56) References Cited

U.S. PATENT DOCUMENTS

| 4,947,332 | A | * | 8/1990 | Ghoneim ........................ 701/84 |
| 5,123,715 | A |   | 6/1992 | Okubo |
| 5,132,906 | A | * | 7/1992 | Sol et al. ........................ 701/80 |

(Continued)

FOREIGN PATENT DOCUMENTS

| JP | 06-001228 A | 1/1994 |
| JP | 06-078736 A | 3/1994 |

(Continued)

OTHER PUBLICATIONS

Y. Shiozawa et al., Non-final Office Action U.S. Appl. No. 13/001,971 DTD Jan. 10, 2013, 10 pgs.

(Continued)

*Primary Examiner* — Jonathan C Teixeira Moffat
*Assistant Examiner* — Alvaro Fortich
(74) *Attorney, Agent, or Firm* — Foley & Lardner LLP

(57) ABSTRACT

A road surface friction coefficient estimating device includes a braking/driving force detecting section for detecting the braking/driving force of a wheel during traveling, a slip ratio detecting section for detecting the slip ratio of the wheel during traveling, and a road surface μ calculating section for estimating the relationship between the detected braking/driving force and the detected slip ratio on the basis of the ratio between the detected braking/driving force and the detected slip ratio, the correlation between the braking/driving force and the slip ratio in the case of the reference road surface, and at least either the detected braking/driving force or the detected slip ratio.

16 Claims, 15 Drawing Sheets

(56) References Cited

U.S. PATENT DOCUMENTS

| | | | |
|---|---|---|---|
| 5,355,717 A | | 10/1994 | Tanaka et al. |
| 5,385,393 A | * | 1/1995 | Tanaka et al. ............... 303/150 |
| 5,948,961 A | * | 9/1999 | Asano et al. ..................... 73/9 |
| 6,015,192 A | * | 1/2000 | Fukumura .................. 303/140 |
| 6,615,124 B1 | | 9/2003 | Adachi |
| 6,895,317 B2 | | 5/2005 | Yasui et al. |
| 6,922,624 B2 | | 7/2005 | Isaji et al. |
| 6,941,213 B2 | | 9/2005 | Yasui et al. |
| 8,078,351 B2 | | 12/2011 | Nardi et al. |
| 2001/0029419 A1 | | 10/2001 | Matsumoto et al. |
| 2002/0166373 A1 | * | 11/2002 | Mancosu et al. .............. 73/146 |
| 2003/0130775 A1 | | 7/2003 | Lu et al. |
| 2003/0195689 A1 | | 10/2003 | Mori |
| 2004/0019417 A1 | | 1/2004 | Yasui et al. |
| 2004/0133324 A1 | | 7/2004 | Yasui et al. |
| 2004/0138831 A1 | | 7/2004 | Watanabe et al. |
| 2004/0163454 A1 | * | 8/2004 | Tsuchie et al. ................ 73/146 |
| 2004/0204812 A1 | * | 10/2004 | Tran ............................... 701/80 |
| 2005/0010350 A1 | | 1/2005 | Hiwatashi |
| 2005/0049774 A1 | * | 3/2005 | Kogure ........................... 701/80 |
| 2006/0041365 A1 | * | 2/2006 | Mori ............................... 701/70 |
| 2006/0201240 A1 | * | 9/2006 | Morinaga ....................... 73/146 |
| 2008/0110249 A1 | * | 5/2008 | DeGeorge et al. ............. 73/146 |
| 2008/0183419 A1 | | 7/2008 | Cong et al. |
| 2008/0228329 A1 | * | 9/2008 | Hartman .......................... 701/1 |
| 2008/0262692 A1 | | 10/2008 | Kogure et al. |
| 2009/0105921 A1 | | 4/2009 | Hanatsuka et al. |
| 2010/0114449 A1 | | 5/2010 | Shiozawa et al. |
| 2010/0131229 A1 | * | 5/2010 | Nardi et al. .................. 702/142 |
| 2010/0211255 A1 | | 8/2010 | Takenaka et al. |
| 2010/0211256 A1 | | 8/2010 | Takenaka et al. |
| 2011/0106458 A1 | | 5/2011 | Shiozawa et al. |
| 2011/0118935 A1 | | 5/2011 | Shiozawa et al. |
| 2011/0130974 A1 | | 6/2011 | Yngve et al. |

FOREIGN PATENT DOCUMENTS

| | | |
|---|---|---|
| JP | 2003-312465 A | 11/2003 |
| JP | 2004-130965 A | 4/2004 |
| JP | 2006-273108 A | 10/2006 |
| JP | 2007-106273 A | 4/2007 |
| JP | 2008-087724 A | 4/2008 |
| WO | WO 2008/133150 A1 | 11/2008 |

OTHER PUBLICATIONS

U.S. Appl. No. 13/001,971, filed Dec. 29, 2010, Shiozawa et al.
Y. Shiozawa et al., Final Office Action U.S. Appl. No. 13/001,971 DTD Jul. 17, 2013, 5 pgs.
Y. Shiozawa et al., Notice of Allowance U.S. Appl. No. 13/001,971 dated Nov. 7, 2013, (13 pgs.).

* cited by examiner

ROAD SURFACE FRICTION COEFFICIENT ESTIMATING DEVICE AND ROAD SURFACE FRICTION COEFFICIENT ESTIMATING METHOD

TECHNICAL FIELD

The present invention relates to a road surface friction coefficient estimating device and a road surface friction coefficient estimating method for estimating a road surface friction coefficient (henceforth referred to also as road surface μ) of a road surface on which an automotive vehicle is traveling.

BACKGROUND OF THE INVENTION

There is a vehicle running control device that measures rotational speed of a driving wheel, estimates a road surface μ on a basis of a maximum of its rotational acceleration, and performs torque control to prevent the driving wheel from slipping (see patent document 1, for example).

Patent document 1: JP 6-78736 A

SUMMARY OF THE INVENTION

Since the device according to patent document 1 estimates the road surface μ on the basis of the rotational speed of the driving wheel, it is impossible to estimate the road surface μ unless the rotational speed actually changes due to slippage of the driving wheel.

It is a problem of the present invention to estimate a road surface μ of a traveled road surface before rotational speed of a wheel actually changes due to slippage of the wheel.

In order to solve the problem, a road surface friction coefficient estimating device according to the present invention comprises: a braking/driving force detecting section that detects a braking/driving force of a wheel; a slip ratio detecting section that detects a slip ratio of the wheel; and a road surface friction coefficient estimating section that: stores information about a characteristic curve in a coordinate plane, wherein the coordinate plane has a coordinate axis representing the braking/driving force and a coordinate axis representing the slip ratio, and wherein the characteristic curve represents a relationship between the braking/driving force and the slip ratio under condition of a reference road surface friction coefficient; finds as a reference point a point in the coordinate plane at which a straight line intersects with the characteristic curve, wherein the straight line passes through an origin point of the coordinate plane and a detected point, and wherein the detected point corresponds to a detected value of the braking/driving force obtained by the braking/driving force detecting section and a detected value of the slip ratio obtained by the slip ratio detecting section; and calculates an estimated value of road surface friction coefficient, on a basis of a reference value and the detected value of at least one of the braking/driving force and the slip ratio, and the reference road surface friction coefficient, wherein the reference value corresponds to the reference point.

Moreover, a road surface friction coefficient estimating method according to the present invention comprises: an operation of detecting a braking/driving force of a wheel; an operation of detecting a slip ratio of the wheel; and an operation of: storing information about a characteristic curve in a coordinate plane, wherein the coordinate plane has a coordinate axis representing the braking/driving force and a coordinate axis representing the slip ratio, and wherein the characteristic curve represents a relationship between the braking/driving force and the slip ratio under condition of a reference road surface friction coefficient; finding as a reference point a point in the coordinate plane at which a straight line intersects with the characteristic curve, wherein the straight line passes through an origin point of the coordinate plane and a detected point, and wherein the detected point corresponds to a detected value of the braking/driving force obtained by the braking/driving force detecting section and a detected value of the slip ratio obtained by the slip ratio detecting section; and calculating an estimated value of road surface friction coefficient, on a basis of a reference value and the detected value of at least one of the braking/driving force and the slip ratio, and the reference road surface friction coefficient, wherein the reference value corresponds to the reference point.

MODE(S) FOR CARRYING OUT THE INVENTION

As described below, according to the present invention, it is possible to detect a braking/driving force of a wheel and a slip ratio of the wheel, and estimate on a basis of them the road surface μ which changes every moment.

The following describes modes for carrying out the invention (henceforth referred to as embodiments) with reference to the drawings.

Figure 1:
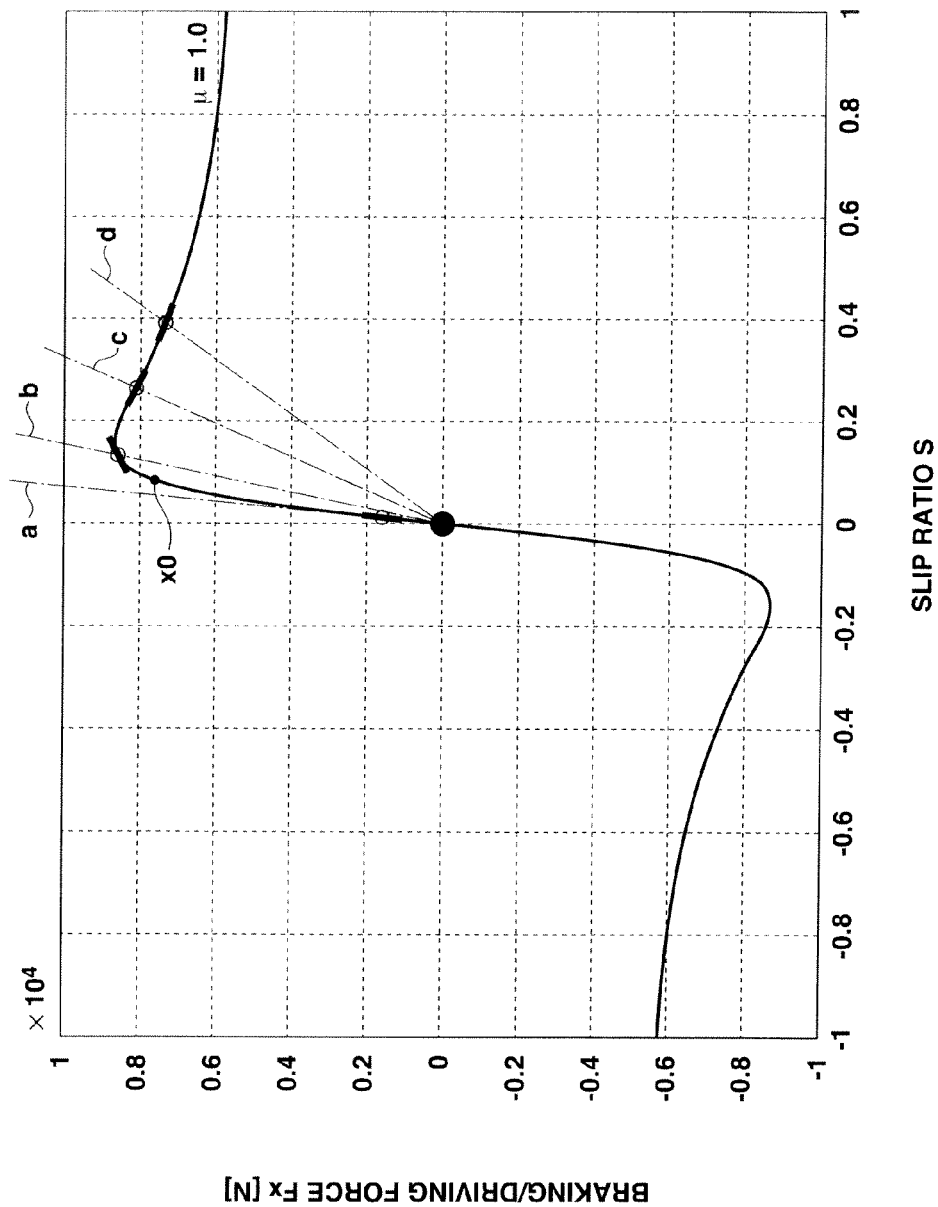
FIG. 1 is a characteristic diagram showing a tire characteristic curve, which is used to explain a technique on which the present invention is based.

<Technique on which the embodiments of the present invention are based> First, the following describes a technique on which the embodiments of the present invention are based. FIG. 1 shows a tire characteristic curve. This tire characteristic curve shows a general relationship which holds between slip ratio S of a driving wheel and braking/driving force Fx of the driving wheel. For example, the tire characteristic curve is obtained from a tire model such as a magic formula tire model. As shown in FIG. 1, along the tire characteristic curve, the relationship between slip ratio S and braking/driving force Fx shifts from linear to nonlinear as the absolute value of slip ratio S increases. Namely, when slip ratio S is in a specific range from zero, a linear relationship holds between slip ratio S and braking/driving force Fx. Then, when the absolute value of slip ratio S has increased to some extent, the relationship between slip ratio S and braking/driving force Fx becomes nonlinear.

In the nonlinear region in the example of FIG. 1, when slip ratio S is at about 0.1, the rate of increase of braking/driving force Fx with respect to slip ratio S decreases. Then, braking/driving force Fx becomes maximum, when slip ratio S is at about 0.15. Then, braking/driving force Fx decreases as slip ratio S increases. This relationship can be easily understood, for example, by focusing attention on the gradient of tangent to a tire characteristic curve.

The gradient of a tangent to the tire characteristic curve is represented by a ratio between an amount of change in slip ratio S and an amount change in braking/driving force Fx, namely, a partial differential coefficient of braking/driving force Fx with respect to slip ratio S. The thus-represented gradient of the tangent to tire characteristic curve can be regarded as the gradient of the tangent to the tire characteristic curve at a point (indicated by a circle in FIG. 1) at which an arbitrary straight line a, b, c or d intersects with the tire characteristic curve. If a point can be identified in the tire characteristic curve, ie. slip ratio S and braking/driving force Fx can be identified, then tire frictional state can be estimated. For example, as shown in FIG. 1 if it is at a point x0 in the tire characteristic curve which is in the nonlinear region but close to the linear region, it can be estimated that the tire frictional state is in stable condition. If the tire frictional state is in stable condition, it can be estimated that the tire is in such a level to exhibit its ability, or alai the vehicle is in stable condition.

Figure 2:
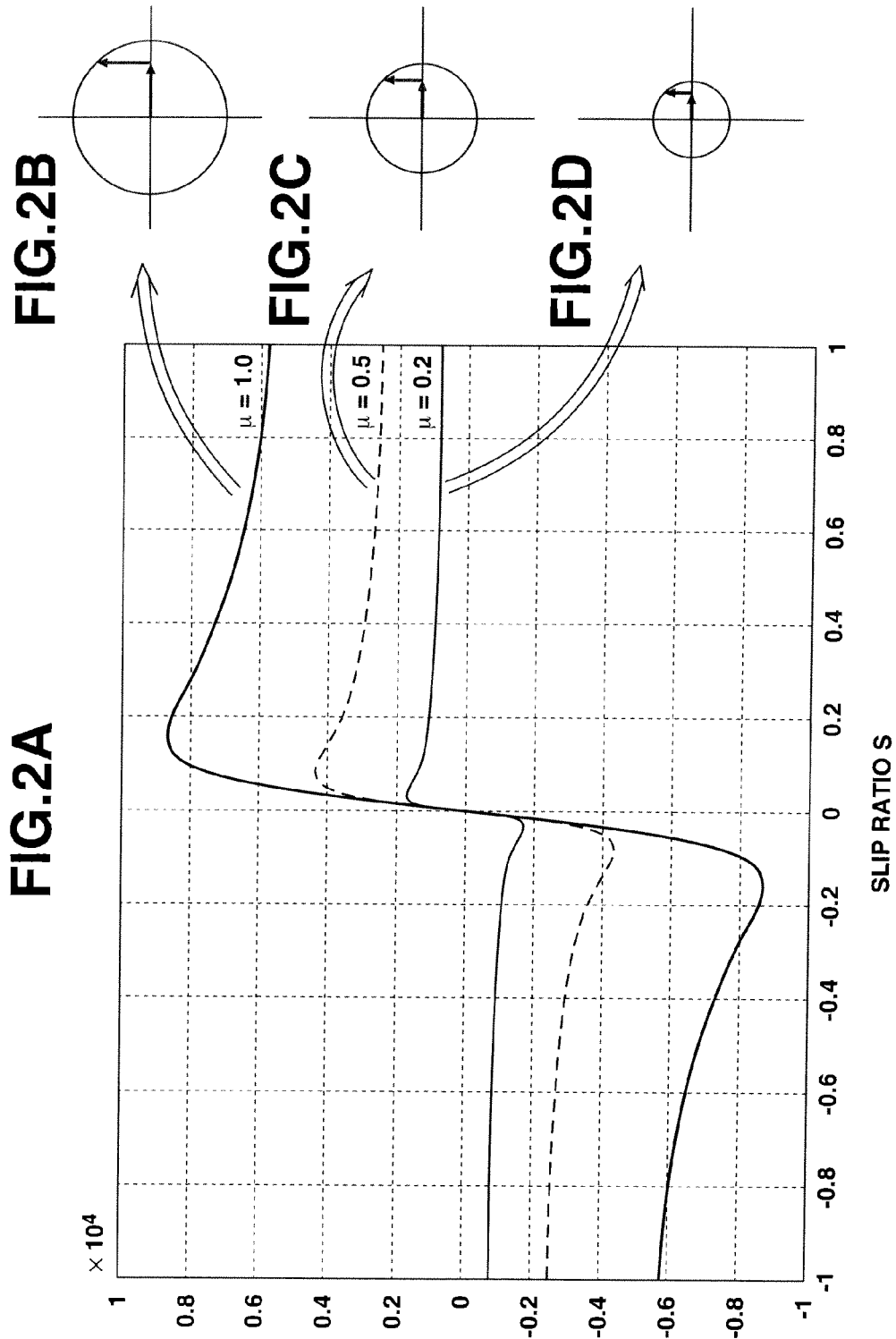
FIG. 2 is a characteristic diagram showing a tire characteristic curve and a tire friction circle under condition of each road surface μ, which is used to explain the technique on which the present invention is based.

FIG. 2 shows a tire characteristic curve and a tire friction circle under condition of each road surface μ. FIG. 2A shows the tire characteristic curve under condition of each road surface μ. FIGS. 2B, 2C and 2D each show a friction circle under condition of each road surface μ. Road surface μ is equal to 0.2, 0.5 or 1.0, for example. As shown in FIG. 2A, the tire characteristic curve for each road surface μ shows characteristics similar to one another. Moreover, as shown in FIGS. 2B, 2C and 2D, the friction circle contracts as road surface μ decreases. Namely, the braking/driving force that the tire can bear decreases as road surface μ decreases.

Figure 3:
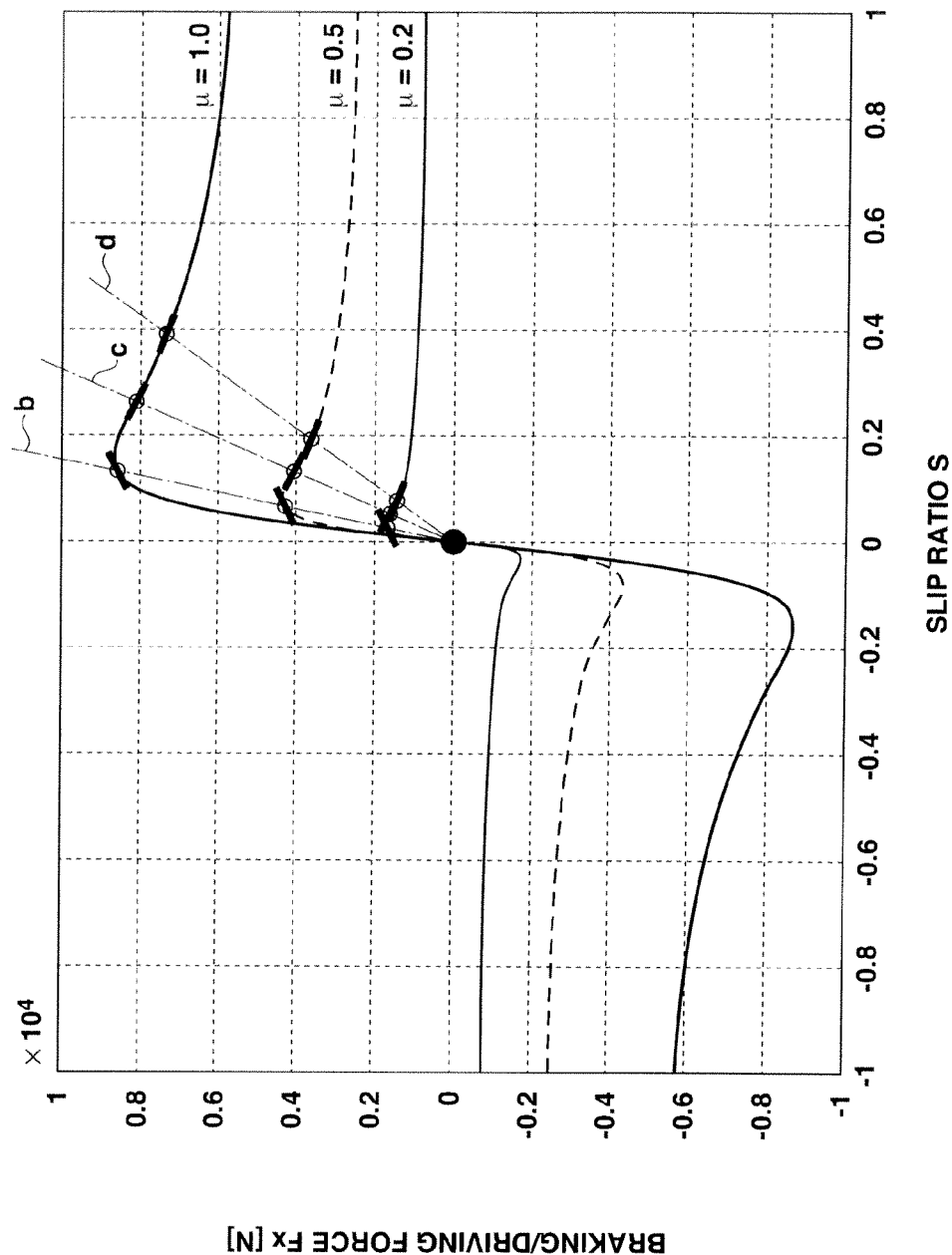
FIG. 3 is a characteristic diagram showing the gradient of tangent to a tire characteristic curve under condition of each road surface μ at points at which the tire characteristic curve intersects with straight lines passing through an origin point of the tire characteristic curve, which is used to explain the technique on which the present invention is based.

FIG. 3 shows a relationship between a tire characteristic curve under condition of each road surface μ and an arbitrary straight line b, c or d passing through an origin point. As shown in FIG. 3, for the tire characteristic curve under condition of each road surface μ, the gradient of tangent at a point at which the tire characteristic curve intersects with the arbitrary straight line b, c or d is obtained. Namely, for the tire characteristic curve under condition of each road surface μ, the gradient of tangent at a point at which the tire characteristic curve intersects with straight line b is obtained; for the tire characteristic curve under condition of each road surface μ, the gradient of tangent at a point at which the tire characteristic curve intersects with straight line c is obtained; and for the tire characteristic curve under condition of each road surface μ, the gradient of tangent at a point at which the tire characteristic curve intersects with straight line d is obtained. As a result, it can be obtained that the gradient of tangent to the tire characteristic curve under condition of each road surface μ at the intersection point with the same straight line is equal to one another.

Figure 4:
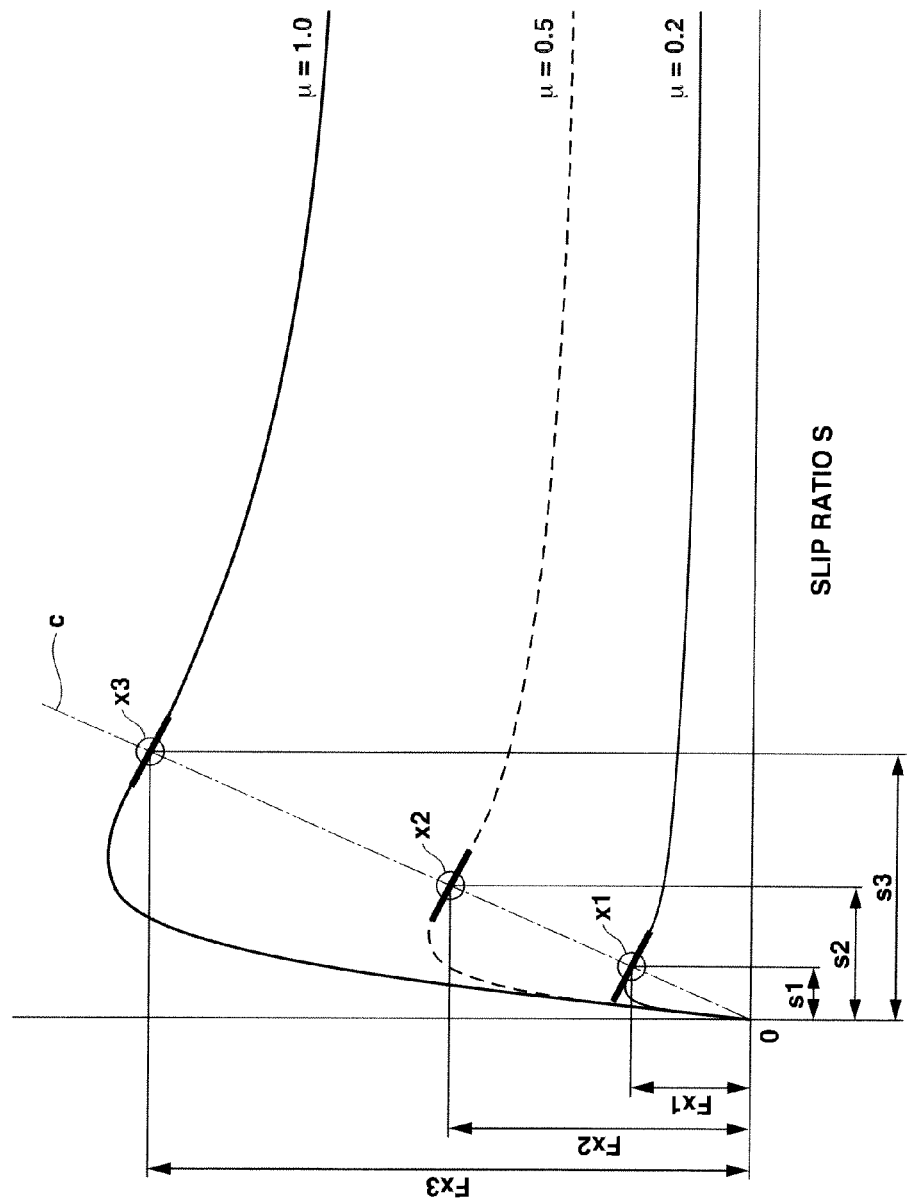
FIG. 4 is another characteristic diagram showing the gradient of tangent to a tire characteristic curve for each road surface μ at a point at which the tire characteristic curve intersects with a straight line passing through an origin point of the tire characteristic curve, which is used to explain the technique on which the present invention is based.

For example, FIG. 4 is focused on straight line c shown in FIG. 3. As shown in FIG. 4, the gradient of tangent to the tire characteristic curve under condition of each road surface μ at the intersection point with straight line c is equal to one another. Namely, the ratio (Fx1/S1) between braking/driving force Fx1 and slip ratio S1 at an intersection point x1 obtained on the tire characteristic curve under condition of road surface μ=0.2, the ratio (Fx2/S2) between braking/driving force Fx2 and slip ratio S2 at an intersection point x2 obtained on the tire characteristic curve under condition of road surface μ=0.5, the ratio (Fx3/S3) between braking/driving force Fx3 and slip ratio S3 at an intersection point x3 obtained on the tire characteristic curve under condition of road surface μ=1.0, are equal to one another. The gradient of tangent at each intersection point x1, x2 or x3 obtained on the tire characteristic curve under condition of each road surface μ is equal to one another.

In this way, even with a difference in road surface μ, the gradient of tangent to each tire characteristic curve at a point is equal to one another, wherein the point is a point (S, Fx) at which the ratio (Fx/S) between braking/driving force Fx and slip ratio S is identical to one another. The ratio in braking/driving force Fx, and the ratio in slip ratio S between the points (S, Fx) of the tire characteristic curves at which the ratio (Fx/S) between braking/driving force Fx and slip ratio S is identical to one another, are equal to the ratio in road surface μ between the tire characteristic curves. Namely, if the ratio in braking/driving force Fx or the ratio in slip ratio S is determined, the ratio in road surface μ can be determined.

Figure 5:
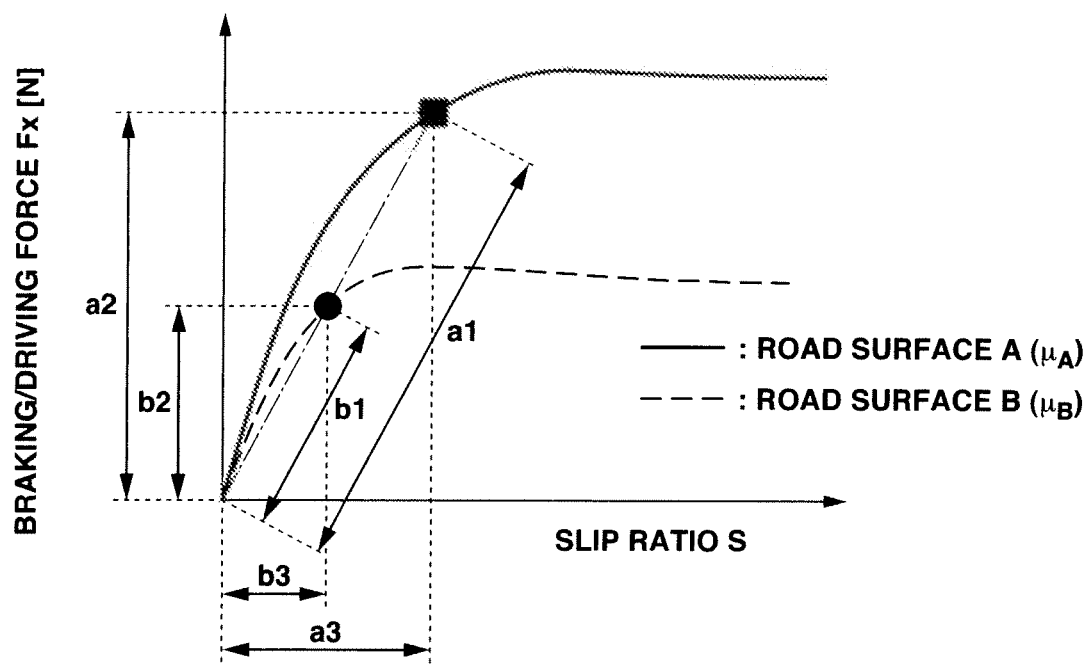
FIG. 5 is a characteristic diagram showing that a ratio in braking/driving force Fx, a ratio in slip ratio S, and a ratio in road surface μ, between tire characteristic curves different in road surface μ, are equal to one another, which is used to explain the technique on which the present invention is based.

FIG. 5 is used to explain that the ratio in braking/driving force Fx, the ratio in slip ratio S, and the ratio in road surface μ, between tire characteristic curves different in road surface μ, are equal to one another. FIG. 5 shows tire characteristic curves obtained under condition of a road surface A (road surface μ=$μ_A$) and a road surface B (road surface μ=$μ_B$) which are different in road surface μ. As shown in FIG. 5, the ratio (a2/b2) between a braking/driving force a2 and a braking/driving force b2 is equal to the ratio ($μ_A/μ_B$) between road surface $μ_A$ of road surface A and road surface $μ_B$ of road surface B, wherein the braking/driving force a2 corresponds to a point (S, Fx) of the tire characteristic curve obtained under condition of road surface A (indicated by a solid box in FIG. 5), and the braking/driving force b2 corresponds to a point (S, Fx) of the tire characteristic curve obtained under condition of road surface B (indicated by a solid circle in FIG. 5), and wherein the points are identical to one another in the ratio (Fx/S) between braking/driving force Fx and slip ratio S. Similarly, the ratio (a3/b3) between a slip ratio a3 and a slip ratio b3 is equal to the ratio ($μ_A/μ_B$) between road surface $μ_A$ of road surface A and road surface $μ_B$ of road surface B, wherein the slip ratio a3 corresponds to a point (S, Fx) of the tire characteristic curve obtained under condition of road surface A, and the slip ratio b3 corresponds to a point (S, Fx) of the tire characteristic curve obtained under condition of road surface B, and wherein the points are identical to one another in the ratio (Fx/S) between braking/driving force Fx and slip ratio S. Accordingly, the ratio (a1/b1) between a line segment length a1 and a line segment length b1 is equal to the ratio ($μ_A/μ_B$) between road surface $μ_A$ of road surface A and road surface $μ_B$ of road surface B, wherein the line segment length a1 is of a line segment connected between the origin point (0, 0) and a point (S, Fx) of the tire characteristic curve obtained under condition of road surface A, and the line segment length b1 is of a line segment between the origin point (0, 0) and a point (S, Fx) of the tire characteristic curve obtained under condition of road surface B, and wherein the points are identical to one another in the ratio (Fx/S) between braking/driving force Fx and slip ratio S.

Figure 6:
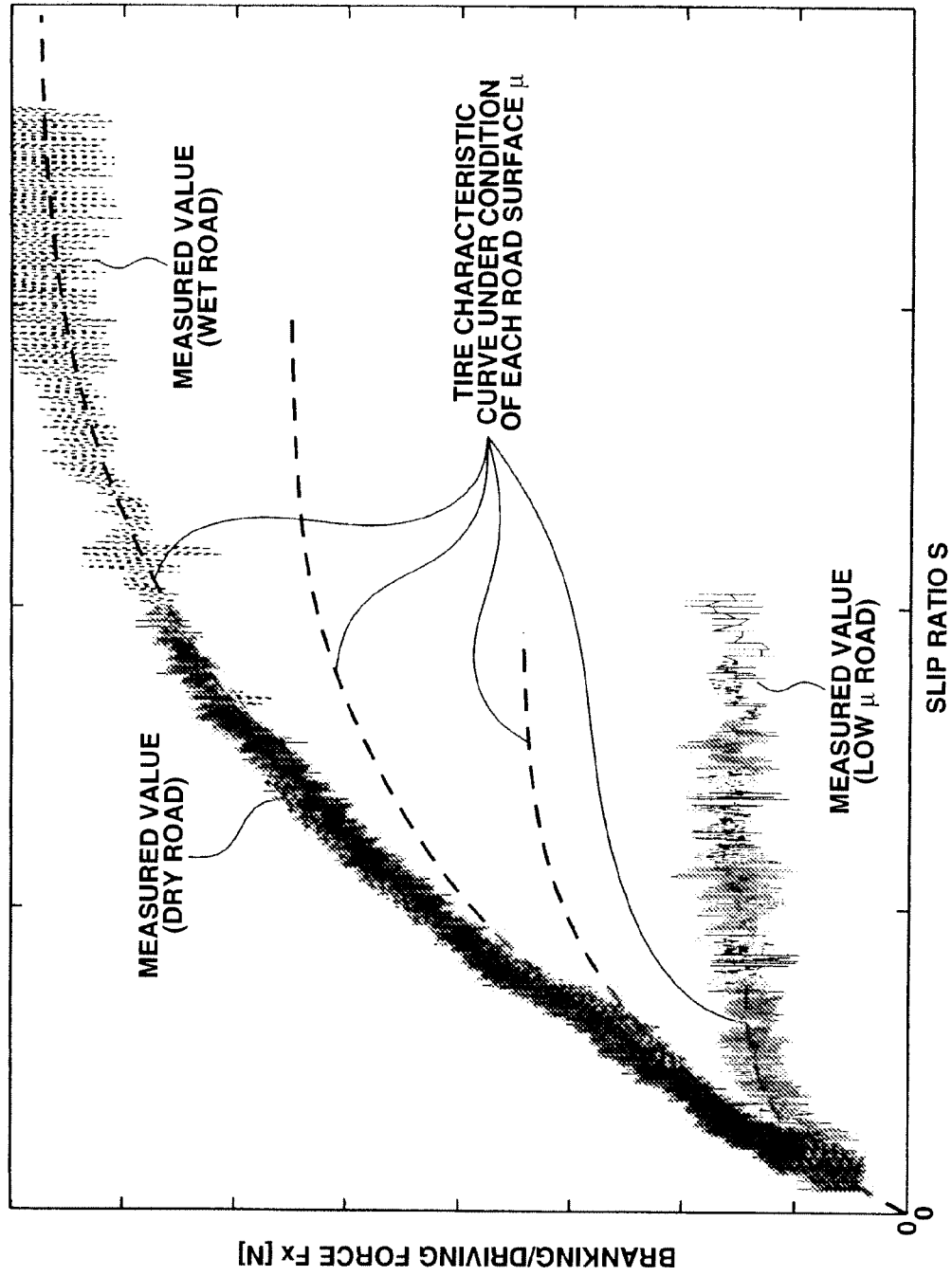
FIG. 6 is a characteristic diagram showing relationships between braking/driving force Fx and slip ratio S which are obtained under condition of road surfaces different in road surface μ, which is used to explain the technique on which the present invention is based.

FIG. 6 shows relationships between braking/driving force Fx and slip ratio S which are obtained under condition of road surfaces different in road surface μ. In FIG. 6, oscillating waves represent measured values under condition of a dry road, a wet road, and a low μ road, and dotted lines represent characteristic curves of a tire (normal tire) under condition of road surfaces. As shown in FIG. 6, among the tire characteristic curves under condition of road surfaces different in road surface μ, braking/driving force Fx and slip ratio S decrease as road surface μ decreases, while the ratio (Fx/S) between braking/driving force Fx and slip ratio S is maintained.

Figure 7:
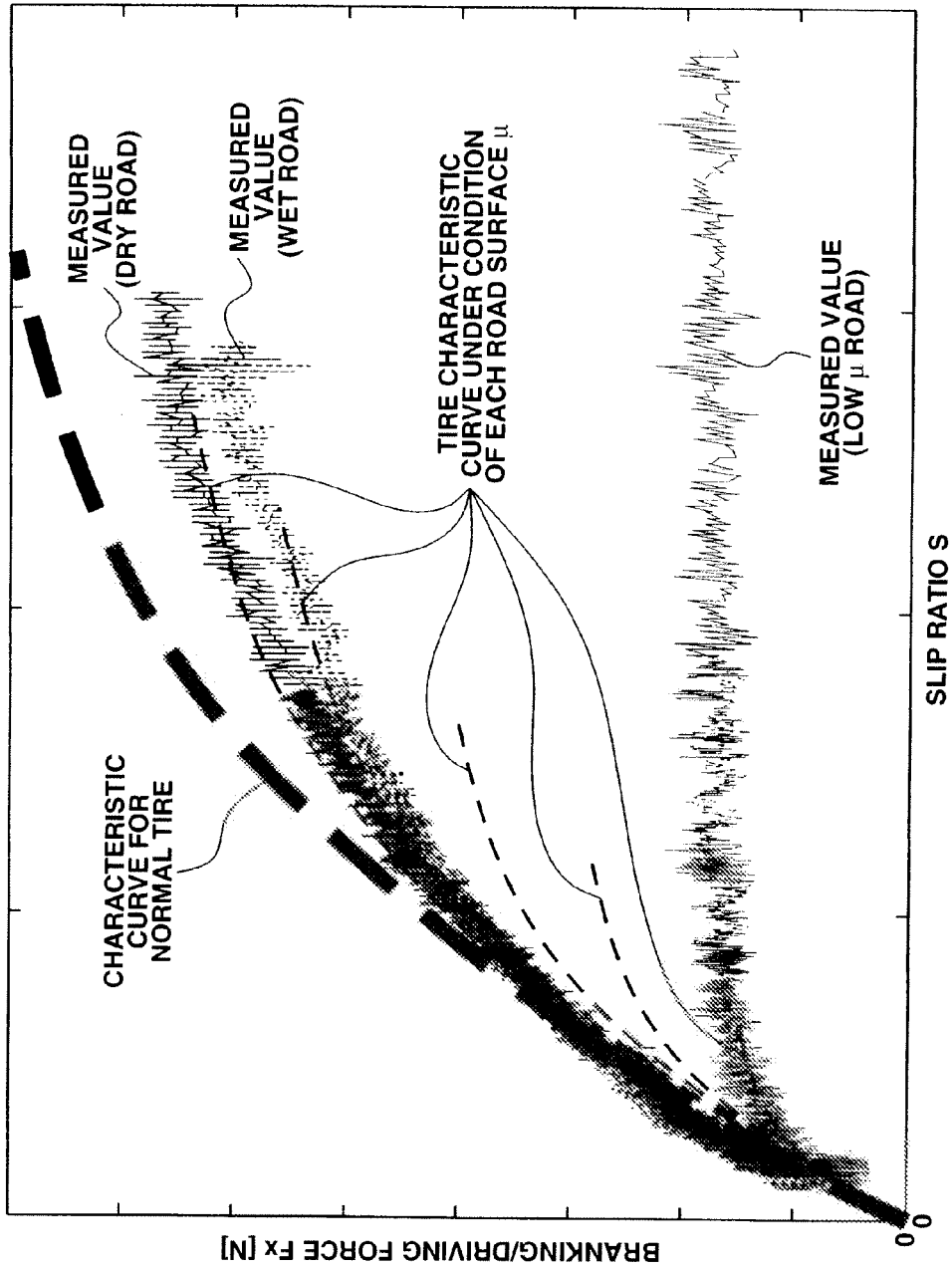
FIG. 7 is a characteristic diagram showing relationships between braking/driving force Fx and slip ratio S which are obtained under condition of road surfaces different in road surface μ in the case of a studless tire, which is used to explain the technique on which the present invention is based.

FIG. 7 shows relationships between braking/driving force Fx and slip ratio S which are obtained under condition of road surfaces different in road surface μ in the case of a studless tire. In FIG. 7, oscillating waves represent measured values under condition of a dry road, a wet road, and a low μ road, and dotted lines represent characteristic curves of the tire under condition of road surfaces. A bold dotted line represents the characteristic curve of a normal tire. As shown in FIG. 7, in the linear region, among the tire characteristic curves (narrow dotted lines) under condition of road surfaces different in road surface μ, braking/driving force Fx and slip ratio S decrease as road surface μ decreases, while the ratio (Fx/S) between braking/driving force Fx and slip ratio S is maintained. Moreover, in the linear region, the ratio (Fx/S) between braking/driving force Fx and slip ratio S of the characteristic curve of the normal tire (bold dotted line) is equal to the ratio (Fx/S) between braking/driving force Fx and slip ratio S of the characteristic curve of the studless tire (narrow dotted lines). Namely, the characteristic curve of the normal tire and the characteristic curve of the studless tire have similar shapes. Namely, studless tires, which are different in gripping force, surface shape, etc., are also identical to normal tires in the ratio (Fx/S) between braking/driving force Fx and slip ratio S of the characteristic curve.

Figure 8:
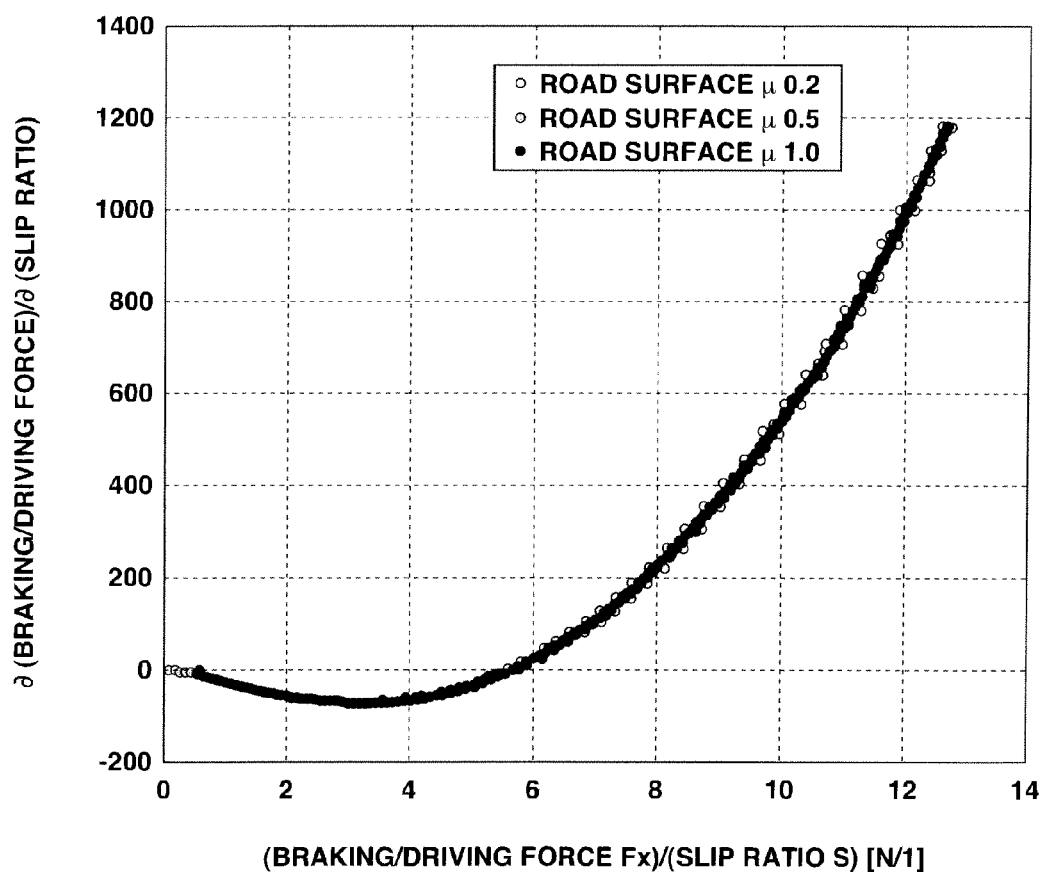
FIG. 8 is a characteristic diagram showing a set of plotted points each of which represents a ratio between braking/driving force Fx and slip ratio S which correspond to a point at which an arbitrary straight line intersects with a tire characteristic curve, and the gradient of tangent to the tire characteristic curve at the intersection point, which is used to explain the technique on which the present invention is based.

FIG. 8 shows a relationship between the ratio (Fx/S) between braking/driving force Fx and slip ratio S which correspond to a point at which an arbitrary straight line intersects with a tire characteristic curve, and the gradient of tangent to the tire characteristic curve at the intersection point (∂(braking/driving force)/∂(slip ratio)). In FIG. 8, values obtained under condition of each road surface μ (for example, μ=0.2, 0.5, 1.0) are plotted. FIG. 8 shows that the ratio (Fx/S) between braking/driving force Fx and slip ratio S and the gradient of tangent to the tire characteristic curve are in a specific relationship, irrespective of road surface μ.

Figure 9:
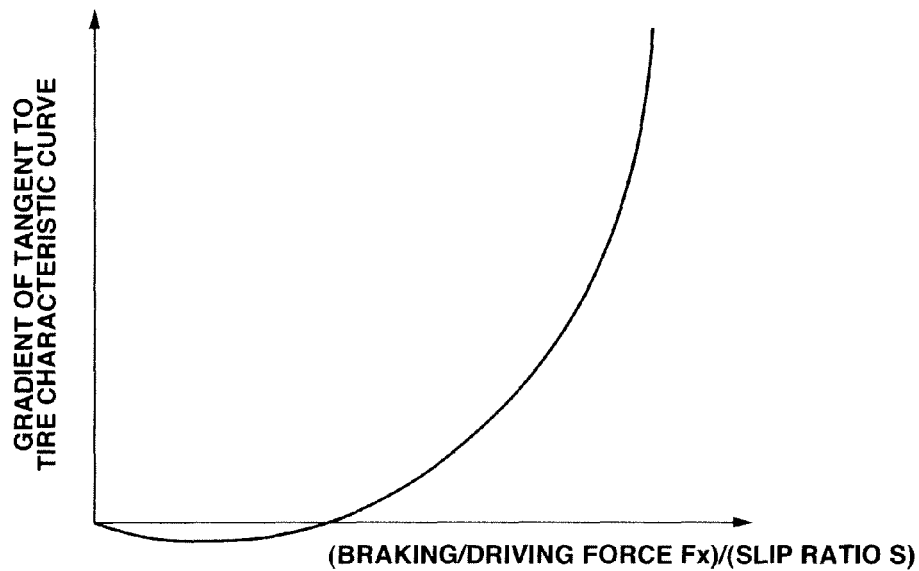
FIG. 9 is a characteristic diagram showing a characteristic curve (braking/driving force characteristic indicator value map) obtained from the plotted points of FIG. 8, which is used to explain the technique on which the present invention is based.

FIG. 9 shows a characteristic curve obtained from the plotted points of FIG. 8. As shown in FIG. 9, this characteristic curve shows that the ratio (Fx/S) between braking/driving force Fx and slip ratio S and the gradient of tangent to the tire characteristic curve are in a specific relationship, irrespective of road surface μ. Accordingly, the characteristic curve shown in FIG. 9 holds even under condition of road surfaces different in road surface μ, such as dry asphalt road surfaces and frozen road surfaces. In the case of this characteristic curve, the gradient of tangent to the tire characteristic curve is negative in a region where the ratio (Fx/S) between braking/driving force Fx and slip ratio S is small. In this region, as the ratio (Fx/S) increases, the gradient of tangent to the tire characteristic curve decreases first, and then increases. Incidentally, when the gradient of tangent to the tire characteristic curve is negative, it means that the partial differential coefficient of braking/driving force with respect to slip ratio is negative.

In a region where the ratio (Fx/S) between braking/driving force Fx and slip ratio S is large, the gradient of the tangent to the tire characteristic curve is positive. In this region, as the ratio (Fx/S) increases, the gradient of the tangent to the tire characteristic curve increases. Incidentally, when the gradient of the tangent to the tire characteristic curve is positive, it means that the partial differential coefficient of the braking/driving force with respect to the slip ratio is positive. When the gradient of the tangent to the tire characteristic curve is maximum, it means that the gradient of the tangent to the tire characteristic curve is within the linear region of the tire characteristic curve. Incidentally, in the linear region, the gradient of the tangent to the tire characteristic curve is constantly equal to a specific value, irrespective of values of braking/driving force fx and slip ratio S.

As described above, the inventors of the present application have found that the gradient of tangent to the tire characteristic curve under a condition of each road surface μ at an intersection point is identical at which intersection point the tire characteristic curse intersects with an arbitrary straight line passing through the origin point of the tire characteristic curve. On the basis of this fact, the inventors of the present application have obtained a result such that the relationship between the ratio between the ratio (Fx/S) between braking/driving force Fx and slip ratio S and the gradient of the tangent to the tire characteristic curve can he expressed by a specific characteristic curve, irrespective of road surface μ (see FIG. 9). Accordingly, if braking/driving force Fx and slip ratio S are determined, it is possible to obtain information about tire frictional state on the basis of the characteristic curve, while information about road surface μ is unnecessary.

The inventors of the present application have found that among tire characteristic curves differing in road surface μ, the ratio of braking/driving force Fx, and the ratio of slip ratio S between points (S, Fx) of the tire characteristic curves at which the ratio (Fx/S) between braking/driving force Fx and slip ratio S are identical to one another, are equal to the ratio of road surface μ between the tire oharacteristic curves. On the basis of this fact, if the ratio of braking/driving force Fx or the ratio of slip ratio S is determined, it is possible to determine the ratio of road surface μ. Accordingly, it is possible to estimate the road surface μ or a currently traveled road surface wan reference to the tire characteristic curve under a condition of a specific value of road surface μ.

Figure 10:
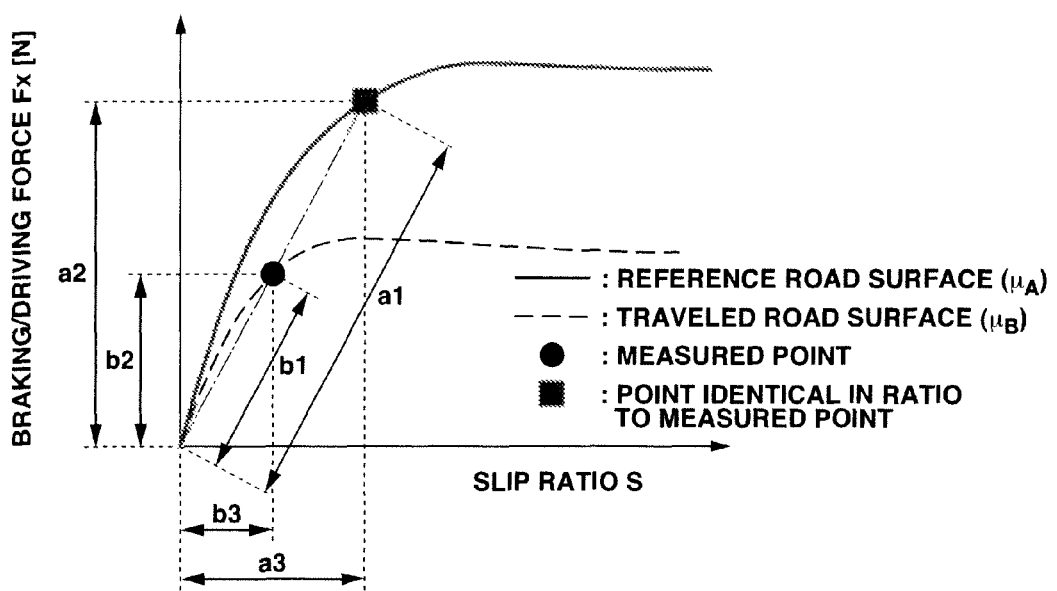
FIG. 10 is a diagram which is used to explain the technique on which the present invention is based, and which is used to explain a procedure of estimating the road surface μ of an actual traveled road surface with reference to a tire characteristic curve under condition of a specific road surface μ.

With reference to FIG. 10, the following describes a procedure of estimating the road surface μ of an actual traveled road surface (traveled road surface as a target of detection) with reference to the tire characteristic curve under condition of a specific value of road surface μ. First, it detects braking/driving force Fxb and slip ratio Sb during traveling. The point (Sb, Fxb) corresponding to the detected braking/driving force Fxb and slip ratio Sb (point indicated by a solid circle in FIG. 10) is on the tire characteristic curve under condition of road surface μ (of the actual traveled road surface) at the time of detection.

Subsequently, it calculates (determines) a point (Sa, Fxa) (point indicated by a solid box in FIG. 10) of the tire characteristic curve under condition of a road surface to as a reference (reference road surface, for example, road surface where road surface μ is equal to 1), wherein the point is identical to the ratio (Fxb/Sb) between the detected braking/driving force Fxb and slip ratio Sb. In the case of estimation based on line segment length, it calculates a ratio (b1/a1) between a line segment length b1 and a line segment length a1, wherein the line segment length b1 is between the origin point and the point (Sb, Fxb) corresponding to the detected braking/driving force Fxb and slip ratio Sb, and the line segment length a1 is between the origin point of the tire characteristic curve under condition of the reference road surface and the point (Sa, Fxa) corresponding to the calculated values on the tire characteristic curve under condition of the reference road surface (the line segment length a1 is an extension of the line segment length b1). Then, it obtains a product ($\mu_A \cdot b1/a1$) of the calculated ratio (b1/a1) and the road surface μ value $\mu_A$ of the reference road surface, and estimates that the road surface μ value $\mu_B$ of the actual traveled road surface is equal to the product ($\mu_A \cdot b1/a1$). In the case of estimation based on braking/driving force Fx, it calculates a ratio (b2/a2) between the magnitude b2 of the detected braking/driving force Fxb and the magnitude a2 of the braking/driving force Fxa that corresponds to the point of the calculated values (Sa, Fxa) on the tire characteristic curve under condition of the reference road surface. Then, it obtains a product ($\mu_A \cdot b2/a2$) of the calculated ratio (b2/a2) and the road surface μ value $\mu_A$ of the reference road surface, and estimates that the road surface μ value $\mu_B$ of the actual traveled road surface is equal to the product ($\mu_A \cdot b2/a2$). Each of a2 and b2 represents a magnitude of braking/driving force, and corresponds to the line segment length a2 or line segment length b2 in FIG. 10, wherein the ratio between a2 and b2 is equal to the ratio between the line segment length a1 and line segment length b1.

In the case of estimation based on slip ratio S, it calculates a ratio (b3/a3) between the magnitude b3 of the detected slip ratio Sb and the magnitude a3 of the slip ratio Sa that corresponds to the point of the calculated values (Sa, Fxa) on the tire characteristic curve under condition of the reference road surface. Then, it obtains a product ($\mu_A \cdot b3/a3$) of the calculated ratio (b3/a3) and the road surface μ value $\mu_A$ of the reference road surface, and estimates that the road surface μ value $\mu_B$ of the actual traveled road surface is equal to the product ($\mu_A \cdot b3/a3$). Each of a3 and b3 represents a magnitude of slip ratio, and corresponds to the line segment length a3 or line segment length b3 in FIG. 10, wherein the ratio between a3 and b3 is equal to the ratio between the line segment length a1 and line segment length b1.

The procedures of estimation based on braking/driving force Fx, slip ratio S, and line segment length are physically equivalent to one another although they are different in expression. According to the procedures described above, it is possible to estimate the road surface μ of an actual traveled road surface with reference to a tire characteristic curve under condition of a specific value of road surface μ.

<Embodiment(S)>

The following describes embodiments implemented with the technique described above.

<First Embodiment>

The first embodiment is a road surface friction coefficient estimating device applied with the present invention.

Figure 11:
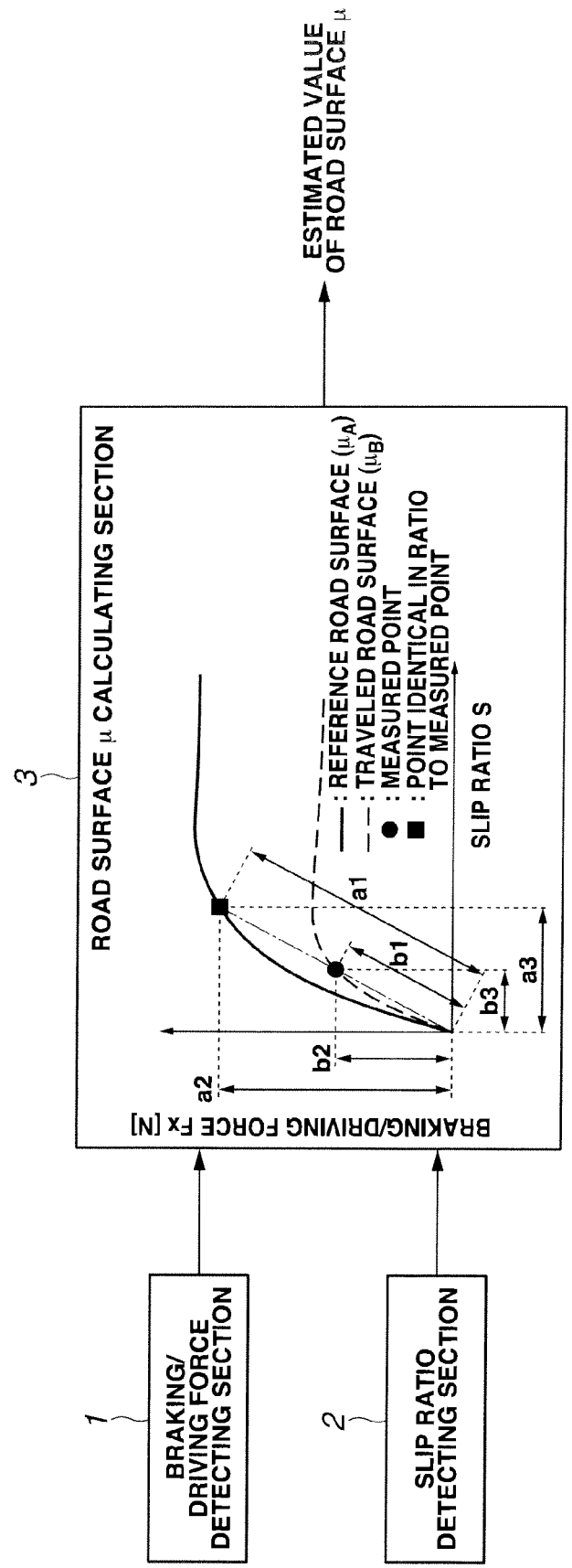
FIG. 11 is a block diagram showing configuration of a road surface friction coefficient estimating device according to a first embodiment of the present invention.

<Configuration> FIG. 11 shows configuration of the road surface friction coefficient estimating device according to the first embodiment. For example, the road surface friction coefficient estimating device is mounted on a vehicle in which running control is performed on the basis of road surface μ. As shown in FIG. 11, the road surface friction coefficient estimating device includes a braking/driving force detecting section 1, a slip ratio detecting section 2, and a road surface μ calculating section (road surface friction coefficient estimating section) 3. Braking/driving force detecting section 1 detects braking/driving force. For example, braking/driving force detecting section 1 detects the braking/driving force on the basis of an output of a driving source or braking device. Braking/driving force detecting section 1 outputs the detected braking/driving force to road surface μ calculating section 3. Slip ratio detecting section 2 detects slip ratio. Slip ratio detecting section 2 detects the slip ratio on the basis of a difference between wheel speed and vehicle speed. Slip ratio detecting section 2 outputs the detected slip ratio to road surface μ calculating section 3.

Road surface μ calculating section 3 stores a tire characteristic curve under condition of a reference road surface in the form of a characteristic map by a storing means such as a memory. The tire characteristic curve under condition of the reference road surface is shown in FIG. 10. The tire characteristic curve under condition of the reference road surface which forms the characteristic map is obtained beforehand, for example, by a running test of the vehicle. For example, the running test is implemented by a straight jerk running test. "Jerk" means changing acceleration. The tire characteristic curve under condition of the reference road surface is obtained based on a relationship between change in slip ratio and change in braking/driving force which is obtained by the straight jerk running test under condition of the reference road surface. Alternatively, the tire characteristic curve under condition of the reference road surface may be obtained by calculation such as simulation instead of the running test. When the reference road surface is high in road surface μ, such as a dry asphalt (μ=1), it is possible to obtain the tire characteristic curve with high accuracy, because it is possible to relatively suppress the influence of disturbance such as noise of measurement equipment during the running test.

Road surface μ calculating section 3 calculates an estimated value of the road surface μ of the actual traveled road surface on the basis of the thus-obtained characteristic map of the tire characteristic curve under condition of the reference road surface. The detailed calculating operation of road surface μ calculating section 3 is described by describing procedural steps in the following.

Figure 14:
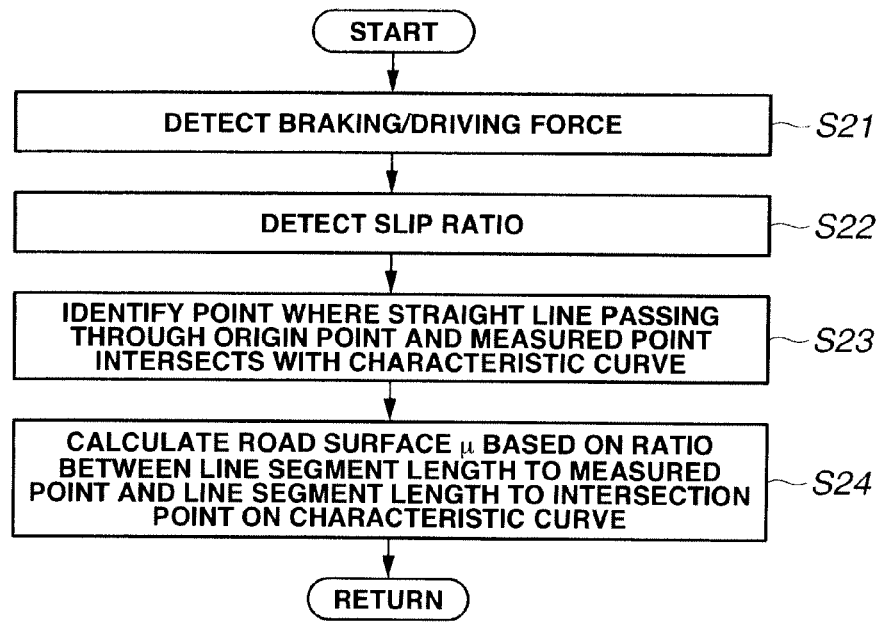
FIG. 14 is a flow chart showing a procedure of calculating an estimated value of road surface μ on a basis of a line segment length of a straight line connecting a measured point and an origin point of a tire characteristic curve.

FIG. 14 shows a procedure for a case of calculating an estimated value of road surface μ of an actual traveled road surface on the basis of line segment length. As shown in FIG. 14, first after the procedure is started, the road surface μ calculating section 3 detects braking/driving force Fxb and slip ratio Sb at Steps S21 and S22. Subsequently, at Step S23, road surface μ calculating section 3 determines values (Sa, Fxa) corresponding to a point at which the tire characteristic curve under condition of the reference road surface intersects with a straight line passing through the origin point (0, 0) of the tire characteristic curve under condition of the reference road surface and a measured point. "Measured point" means a point (Sb, Fxb) in the characteristic map which corresponds to the braking/driving force Fxb and slip ratio Sb detected at Steps S21 and S22.

Subsequently, at Step S24, road surface μ calculating section 3 calculates an estimated value of the road surface μ value $\mu_B$ of the actual traveled road surface. Specifically, road surface μ calculating section 3 calculates ratio (Lb/La) between a line segment length Lb ($=\sqrt{(Sb^2+Fxb^2)}$) and a line segment length La ($=\sqrt{(Sa^2+Fxa^2)}$), wherein the line segment length Lb is of a straight line connected between the origin point of the tire characteristic curve under condition of the reference road surface and the measured point (Sb, Fxb), and the line segment length La is of a straight line connected between the origin point of the tire characteristic curve under condition of the reference road surface and the intersection point (Sa, Fxa) on the tire characteristic curve under condition of the reference road surface which is determined at Step S23. Then, road surface μ calculating section 3 obtains a product of the calculated ratio (Lb/La) and the road surface μ value $\mu_A$ of the reference road surface obtained from the characteristic map (tire characteristic curve), and estimates that the road surface μ value $\mu_B$ of the actual traveled road surface is equal to the product ($\mu_B=\mu_A\cdot$Lb/La). In the equation, the coefficient of road surface μ value $\mu_A$ (i.e. (Lb/La)) is referred to as "ratio to reference". In this way, road surface μ calculating section 3: calculates as a first distance a distance in a coordinate plane between a detected point and a point at which braking/driving force is equal to zero; calculates as a second distance a distance in the coordinate plane between a reference point and a point at which the braking/driving force is equal to zero; and calculates the ratio to reference on a basis of the first and second distances.

The estimated value of road surface μ of the actual traveled road surface is calculated according to the foregoing procedure. In other words, it estimates the relationship between the detected braking/driving force Fxb and slip ratio Sb under condition of the road surface μ of the actual traveled road surface. For example, it is possible to estimate a maximum road surface μ at which braking/driving force is equal to an allowable maximum value, under condition of the actual traveled road surface. For example, on the basis of the relationship between braking/driving force Fxb and slip ratio Sb detected as shown in FIG. 10, it is possible to estimate the maximum road surface μ which corresponds to the boundary where the change in braking/driving force Fxb with respect to increase in slip ratio Sb turns from increasing to decreasing.

Figure 12:
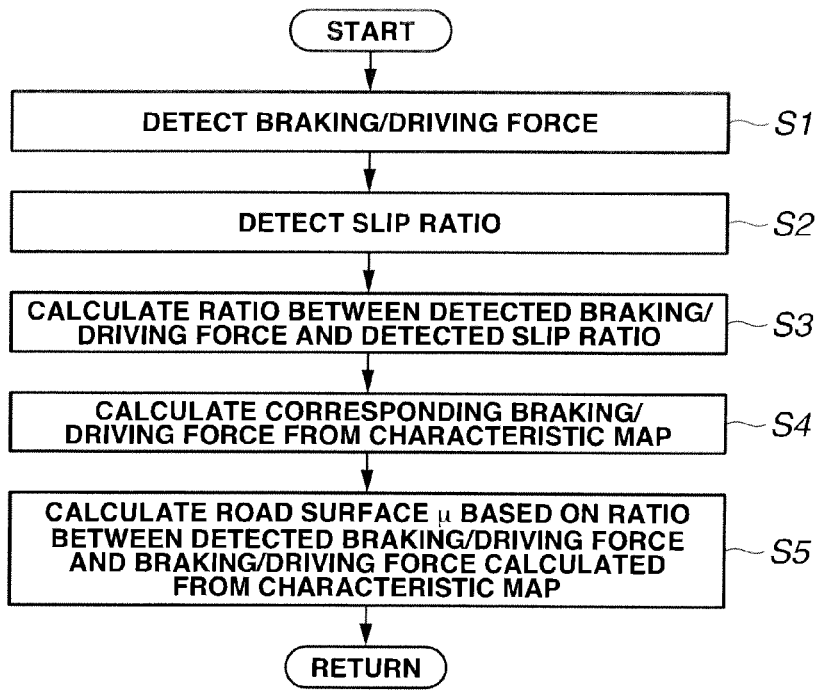
FIG. 12 is a flow chart showing a procedure of calculating an estimated value of road surface μ on a basis of a detected braking/driving force Fxb.

The first embodiment can be implemented by the following configuration. Specifically, it is possible to calculate an estimated value of road surface μ of an actual traveled road surface on the basis of braking/driving force. FIG. 12 shows a procedure of calculating an estimated value of road surface μ of an actual traveled road surface. As shown in FIG. 12, first after the procedure is started, braking/driving force detecting section 1 detects braking/driving force Fxb at Step S1. Subsequently, at Step S2, slip ratio detecting section 2 detects slip ratio Sb.

Subsequently, at Step S3, road surface μ calculating section 3 calculates the ratio (Fxb/Sb) between the braking/driving force Fxb and slip ratio Sb detected at Steps S1 and S2. Subsequently, at Step S4, road surface μ calculating section 3 calculates a corresponding braking/driving force Fxa from the tire characteristic curve under condition of the reference road surface in the form of the characteristic map. Namely, road surface μ calculating section 3 determines the braking/driving force Fxa and slip ratio Sa whose ratio is identical to the ratio (Fxb/Sb) between the braking/driving force Fxb and slip ratio Sb that is calculated at Step S3, and thus obtains the braking/driving force Fxa.

Subsequently, at Step S5, road surface μ calculating section 3 calculates an estimated value of the road surface μ value $\mu_B$ of the actual traveled road surface. Specifically, road surface μ calculating section 3 obtains a product of the ratio (Fxb/Fxa) between the braking/driving force Fxb detected at Step S1 and the braking/driving force Fxa calculated from the characteristic map at Step S4, and the road surface μ value $\mu_A$ of the reference road surface obtained from the characteristic map (tire characteristic curve), and obtains the estimated value $\mu_B$ of the road surface μ of the actual traveled road surface that is equal to the product ($\mu_B=\mu_A\cdot$Fxb/Fxa).

Figure 13:
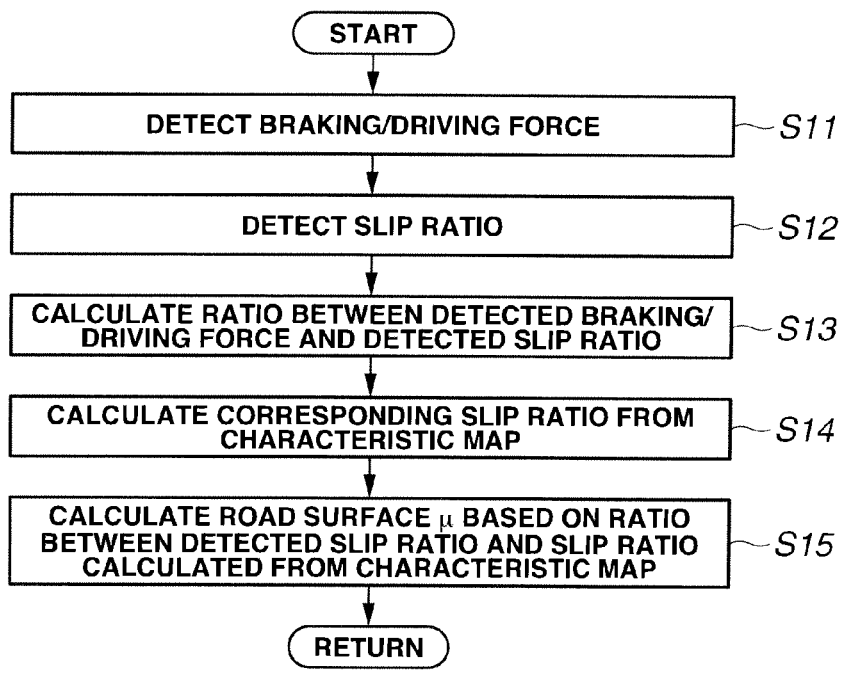
FIG. 13 is a flow chart showing a procedure of calculating an estimated value of road surface μ on a basis of a detected slip ratio Sb.

The first embodiment can be implemented by the following configuration. Specifically, it is possible to calculate an estimated value of road surface μ of an actual traveled road surface on the basis of slip ratio. FIG. 13 shows a procedure for a case of calculating an estimated value of road surface μ of an actual traveled road surface. As shown in FIG. 13, first after the procedure is started, road surface μ calculating section 3 detects braking/driving force Fxb and slip ratio Sb at Steps S11 and S12, as in FIG. 12. Subsequently, at Step S13, road surface μ calculating section 3 calculates a ratio (Fxb/Sb) between the braking/driving force Fxb and slip ratio Sb detected at Steps S11 and S12, as in FIG. 12.

Subsequently, at Step S14, road surface μ calculating section 3 calculates a corresponding slip ratio Sa from the tire characteristic curve under condition of the reference road surface in the form of the characteristic map. Namely, road surface μ calculating section 3 determines the braking/driving force Fxa and slip ratio Sa whose ratio is identical to the ratio (Fxb/Sb) between the braking/driving force Fxb and slip ratio Sb that is calculated at Step S13, and thus obtains the slip ratio Sa. Subsequently, at Step S15, road surface μ calculating section 3 calculates an estimated value of the road surface μ value $\mu_B$ of the actual traveled road surface. Specifically, road surface μ calculating section 3 obtains a product of the ratio (Sb/Sa) between the slip ratio Sb detected at Step S12 and the slip ratio Sa calculated from the characteristic map at Step S14, and the road surface μ value $\mu_A$ of the reference road surface obtained from the characteristic map (tire characteristic curve), and obtains the estimated value $\mu_B$ of the road surface μ of the actual traveled road surface that is equal to the product ($\mu_B = \mu_A \cdot Sb/Sa$).

This embodiment is described in the case where the tire characteristic curve has a horizontal axis representing the slip ratio S and a vertical axis representing the braking/driving force Fx. This may be modified so that the tire characteristic curve is expressed in another form.

Figure 15:
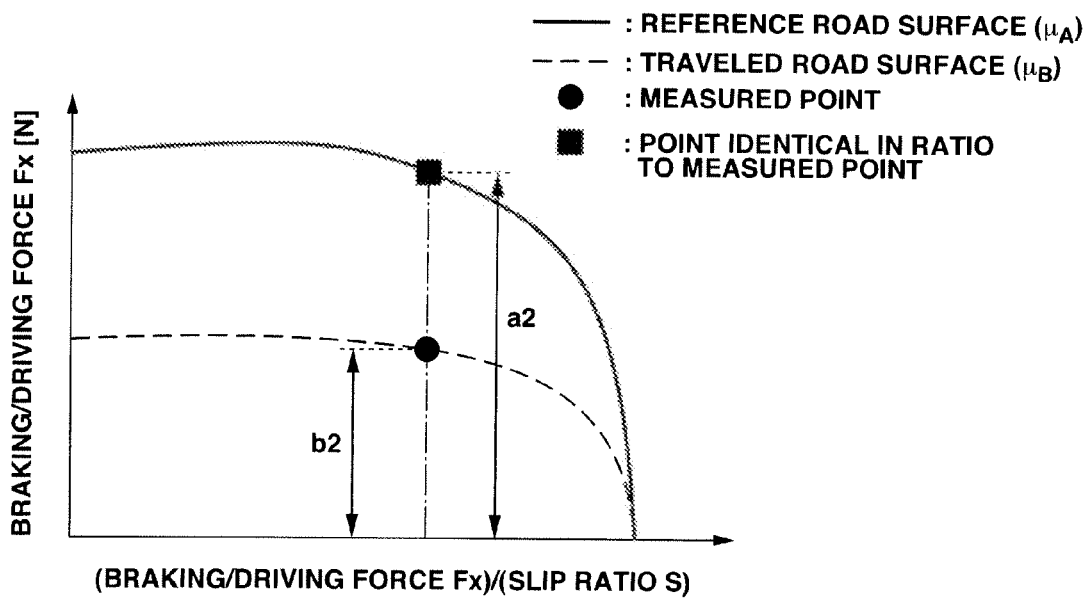
FIG. 15 is a characteristic diagram showing a tire characteristic curve (characteristic map) which has a horizontal axis representing the ratio (Fx/S) between braking/driving force Fx and slip ratio S, and a vertical axis representing the braking/driving force Fx.

FIG. 15 shows another example of tire characteristic curve which has a horizontal axis representing the ratio (Fx/S) between braking/driving force Fx and slip ratio S, and a vertical axis representing the braking/driving force Fx. Road surface μ calculating section 3 calculates an estimated value of the road surface μ value $\mu_B$ of the actual traveled road surface on the basis of the characteristic map composed of the tire characteristic curve under condition of the reference road surface shown in FIG. 15. Specifically, as described in the foregoing embodiment, road surface μ calculating section 3 detects braking/driving force Fxb and slip ratio Sb. Road surface μ calculating section 3 determines the braking/driving force Fxa (a2) with which the ratio is identical to the ratio (Fxb/Sb) between the detected braking/driving force Fxb and slip ratio Sb. Subsequently, road surface μ calculating section 3 obtains a product of the ratio (Fxb/Fxa(=b2/a2)) between the detected braking/driving force Fxb (b2) and the braking/driving force Fxa determined from the tire characteristic curve, and the road surface μ value $\mu_A$ of the reference road surface obtained from the tire characteristic curve, and obtains the estimated value $\mu_B$ of the road surface μ of the actual traveled road surface that is equal to the product ($\mu_B = \mu_A \cdot Fxb/Fxa$).

Figure 16:
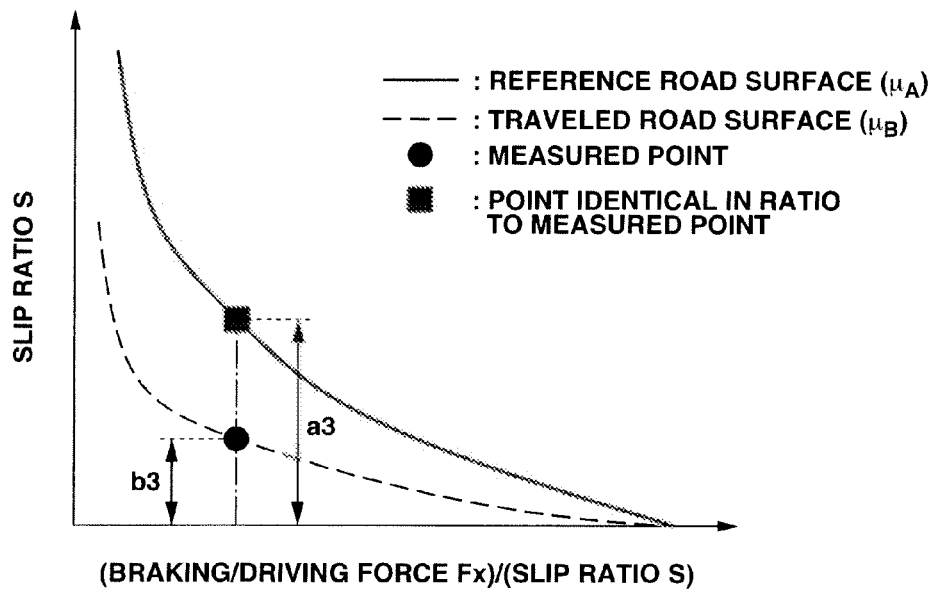
FIG. 16 is a characteristic diagram showing a tire characteristic curve (characteristic map) which has a horizontal axis representing the ratio (Fx/S) between braking/driving force Fx and slip ratio S, and a vertical axis representing the slip ratio S.

Moreover, FIG. 16 shows another example of tire characteristic curve which has a horizontal axis representing the ratio (Fx/S) between braking/driving force Fx and slip ratio S, and a vertical axis representing the slip ratio S. Road surface μ calculating section 3 calculates an estimated value of the road surface μ value $\mu_B$ of the actual traveled road surface on the basis of the characteristic map composed of the tire characteristic curve under condition of the reference road surface shown in FIG. 16. Specifically, as described in the foregoing embodiment, road surface μ calculating section 3 detects braking/driving force Fxb and slip ratio Sb. Road surface μ calculating section 3 determines the slip ratio Sa (a3) with which the ratio is identical to the ratio (Fxb/Sb) between the detected braking/driving force Fxb and slip ratio Sb. Subsequently, road surface μ calculating section 3 obtains a product of the ratio (Sb/Sa(=b3/a3)) between the detected slip ratio Sb (b2) and the slip ratio Sa determined from the tire characteristic curve, and the road surface μ value $\mu_A$ of the reference road surface obtained from the tire characteristic curve, and obtains the estimated value $\mu_B$ of the road surface μ of the actual traveled road surface that is equal to the product ($\mu_B = \mu_A \cdot Sb/Sa$).

The first embodiment is described with reference to the case where the characteristic map is used. This may be implemented by another method. Specifically, this may be implemented using a mathematical expression. The mathematical expression provides a tire characteristic curve as in the form of characteristic map, wherein wheel braking/driving force and wheel slip ratio are variables. As in the case of the characteristic map, the road surface μ of an actual traveled road surface is estimated on the basis of the tire characteristic curve provided by the mathematical expression and the detected braking/driving force and slip ratio, for example, by means of simultaneous equations.

The first embodiment is described with reference to the case where the reference road surface, under condition of which the tire characteristic curve (characteristic map, etc.) is obtained, has a high road surface μ. However, the road surface μ of the reference road surface is unlimited, if it is possible to estimate the road surface μ of the actual traveled road surface on the basis of the ratio between the road surface μ of the reference road surface and the road surface μ of the actual traveled road surface. For example, it is possible to obtain a tire characteristic curve (characteristic map, etc.) under condition of a reference road surface having a low road surface μ, such as a wet road surface or a frozen road surface.

In the first embodiment, braking/driving force detecting section 1 implements a braking/driving force detecting means for detecting the braking/driving force of a wheel. Slip ratio detecting section 2 implements a slip ratio detecting means for detecting the slip ratio of the wheel. Road surface μ calculating section 3 (particularly, the storing means for storing the characteristic map, wherein the storing means is a memory, for example) implements a correlation obtaining means for obtaining a correlation (or a reference curve representing the correlation) between the braking/driving force of the wheel and the slip ratio of the wheel under condition of a reference road surface. Moreover, road surface μ calculating section 3 implements a ratio calculating means for calculating a ratio between the braking/driving force detected by the braking/driving force detecting means and the slip ratio detected by the slip ratio detecting means. Moreover, road surface μ calculating section 3 implements a road surface friction coefficient estimating means for estimating a relationship between the braking/driving force and slip ratio on the basis of the ratio calculated by the ratio calculating means, the correlation obtained by the correlation obtaining means, and at least one of the braking/driving force detected by the braking/driving force detecting means and the slip ratio detected by the slip ratio detecting means.

In the first embodiment, road surface μ calculating section 3 (particularly, the storing means for storing the characteristic map, wherein the storing means is a memory, for example) implements a characteristic curve obtaining means for obtaining a characteristic curve that represents a relationship between the braking/driving force of a wheel and the slip ratio of the wheel under condition of a reference road surface. Braking/driving force detecting section 1 implements a braking/driving force detecting means for detecting the braking/driving force of the wheel during traveling. Slip ratio detecting section 2 implements a slip ratio detecting means for detecting the slip ratio of the wheel during traveling. Road surface μ calculating section 3 implements: a ratio calculating means for calculating a ratio between the braking/driving force detected by the braking/driving force detecting means and the slip ratio detected by the slip ratio detecting means; a determining means for determining the braking/driving force of the wheel or the slip ratio of the wheel on the characteristic curve obtained by the characteristic curve obtaining means, wherein the ratio between the braking/driving force of the wheel and the slip ratio of the wheel is identical to the ratio calculated by the ratio calculating means; and an actual road surface μ calculating means for calculating an actual road surface μ of a traveled road surface, on the basis of the ratio between the braking/driving force of the wheel determined by the determining means and the braking/driving force detected by the braking/driving force detecting means or the ratio between the slip ratio determined by the determining means and the slip ratio detected by the slip ratio detecting means, and the road surface μ of the reference road surface.

The first embodiment implements a road surface friction coefficient estimating method comprising: detecting the braking/driving force and slip ratio of a wheel; calculating a ratio between the detected braking/driving force and slip ratio; and estimating a relationship between the braking/driving force and the slip ratio, on the basis of the calculated ratio, a correlation between the braking/driving force of the wheel and the slip ratio of the wheel under condition of a reference road surface, and at least one of the detected braking/driving force and slip ratio.

The first embodiment implements a road surface friction coefficient estimating method comprising: detecting the braking/driving force and slip ratio of a wheel; calculating a ratio between the detected braking/driving force and slip ratio; determining the braking/driving force of the wheel or the slip ratio of the wheel on a characteristic curve, wherein the ratio between the braking/driving force of the wheel and the slip ratio of the wheel is identical to the calculated ratio, and wherein the characteristic curve is obtained as a relationship between the braking/driving force and slip ratio of the wheel under condition of a reference road surface; and calculating an actual road surface μ of a traveled road surface, on the basis of the ratio between the determined braking/driving force of the wheel and the detected braking/driving force of the wheel or the ratio between the determined slip ratio of the wheel and the detected slip ratio of the wheel, and the road surface μ of the reference road surface.

<Operation and Effect> The first embodiment operates and produces effects as follows.

<1> It detects the braking/driving force and slip ratio of a wheel during traveling, and calculates a ratio between the detected wheel braking/driving force and wheel slip ratio. Then, it estimates a relationship between the braking/driving force and the slip ratio on a basis of the calculated ratio, a tire characteristic curve, and at least one of the detected braking/driving force and slip ratio, wherein the tire characteristic curve is obtained as a correlation between the braking/driving force of the wheel and the slip ratio of the wheel under condition of a reference road surface. This makes it possible to estimate on the basis of the ratio between the braking/driving force and slip ratio the road surface μ that changes every moment, if the braking/driving force and slip ratio can be detected. Namely, it is possible to estimate the road surface μ before the occurrence of slippage. Accordingly, it is possible to estimate the relationship between the slip ratio and the road surface μ of a traveled road surface (or braking/driving force).

Specifically, it detects the braking/driving force and slip ratio of a wheel during traveling, and calculates a ratio between the detected wheel braking/driving force and wheel slip ratio. Moreover, it determines the braking/driving force of the wheel or the slip ratio of the wheel on a tire characteristic curve, wherein the ratio between the braking/driving force of the wheel and the slip ratio of the wheel is identical to the calculated ratio, and wherein the tire characteristic curve is obtained as a relationship between the braking/driving force of the wheel and the slip ratio of the wheel under condition of a reference road surface. Then, it calculates an actual road surface μ of a traveled road surface on the basis of the ratio between the determined braking/driving force of the wheel and the detected braking/driving force or the ratio between the determined slip ratio and the detected slip ratio, and the road surface μ of the reference road surface.

This makes it possible to calculate on the basis of the ratio between the braking/driving force and slip ratio the actual road surface μ of the traveled road surface, if the braking/driving force and slip ratio can be detected. Accordingly, it is possible to estimate the road surface μ of the traveled road surface before the occurrence of slippage.

Moreover, it is possible to easily estimate the road surface μ of the traveled road surface by using the tire characteristic curve under condition of the reference road surface, wherein it is sufficient to obtain a tire characteristic curve under condition of a specific single road surface.

For example, a method is conceivable of: having obtained tire characteristic curves under condition of road surfaces different in road surface μ; and estimating the road surface μ of an actual traveled road surface by interpolation between the existing tire characteristic curves, when there is no tire characteristic curve to obtain the road surface μ of the actual traveled road surface. However, in such a case, the accuracy of estimating the road surface μ is low, because of the use of a plurality of tire characteristic curves, the interpolation, etc. In contrast, in the case of the present invention, it is possible to estimate the road surface μ of the traveled road surface easily and accurately, because the road surface μ of the traveled road surface can be estimated only on the basis of the tire characteristic curve under condition of a specific single road surface.

<2> It estimates a relationship between the detected braking/driving force and the detected slip ratio, using a characteristic map composed of a tire characteristic curve that has a coordinate axis representing the braking/driving force and a coordinate axis representing the slip ratio. This makes it possible to easily estimate the road surface μ that changes every moment.

<3> It estimates a relationship between the detected braking/driving force and the detected slip ratio, using a characteristic map composed of a tire characteristic curve that has a coordinate axis representing the ratio between braking/driving force and slip ratio, and a coordinate axis representing the braking/driving force. This makes it possible to easily estimate the road surface μ that changes every moment.

<4> It estimates a relationship between the detected braking/driving force and the detected slip ratio, using a characteristic map composed of a tire characteristic curve that has a coordinate axis representing the ratio between braking/driving force and slip ratio, and a coordinate axis representing the slip ratio. This makes it possible to easily estimate the road surface μ that changes every moment.

<5> It obtains a tire characteristic curve in the form of a mathematical expression wherein braking/driving force and slip ratio are variables. This makes it possible to easily estimate the road surface μ that changes every moment.

<Second Embodiment>

The second embodiment is an electric drive vehicle applied with the present invention.

Figure 17:
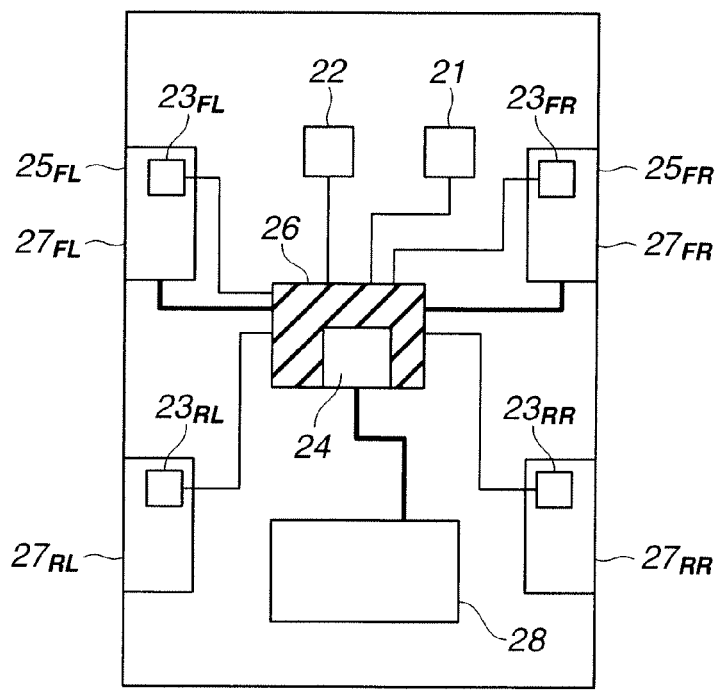
FIG. 17 is a diagram showing configuration of an electric drive vehicle according to a second embodiment of the present invention.

<Configuration> FIG. 17 shows schematic configuration of an electric drive vehicle (two wheel drive vehicle) according to the second embodiment. As shown in FIG. 17, the electric drive vehicle includes an accelerator pedal operation amount detecting section 21, a brake pedal operation amount detecting section 22, wheel speed detecting sections $23_{FL}$, $23_{FR}$, $23_{RL}$ and $23_{RR}$, an acceleration sensor 24, driving motors $25_{FL}$ and $25_{FR}$, a system control section 26, driving wheels $27_{FL}$ and $27_{FR}$, and a battery 28.

Accelerator pedal operation amount detecting section 21 detects an amount of operation of an accelerator pedal by a driver (accelerator opening). Accelerator pedal operation amount detecting section 21 outputs a result of the detection (accelerator opening) to system control section 26. Brake pedal operation amount detecting section 22 detects an amount of operation of a brake pedal by the driver. Brake pedal operation amount detecting section 22 outputs a result of the detection to system control section 26. Wheel speed detecting sections $23_{FL}$, $23_{FR}$, $23_{RL}$ and $23_{RR}$ detect the wheel speeds $V_{FL}$, $V_{FR}$, $V_{RL}$ and $V_{RR}$ of wheels $27_{FL}$, $27_{FR}$, $27_{RL}$ $27_{RR}$ that are attached to a vehicle body. Wheel speed detecting sections $23_{FL}$, $23_{FR}$, $23_{RL}$ and $23_{RR}$ outputs a result of the detection to system control section 26. Acceleration sensor 24 detects the longitudinal acceleration and lateral acceleration of the vehicle. Acceleration sensor 24 outputs a result of the detection (longitudinal G, lateral G) to system control section 26. According to a driving torque command value "Tout" that is outputted by system control section 26, the driving motors $25_{FL}$ and $25_{FR}$ generate driving torque to rotate the driving wheels $27_{FL}$ and $27_{FR}$. The driving torque command value Tout is in the form of a current that is supplied from battery 28 for controlling the driving motors $25_{FL}$ and $25_{FR}$.

Figure 18:
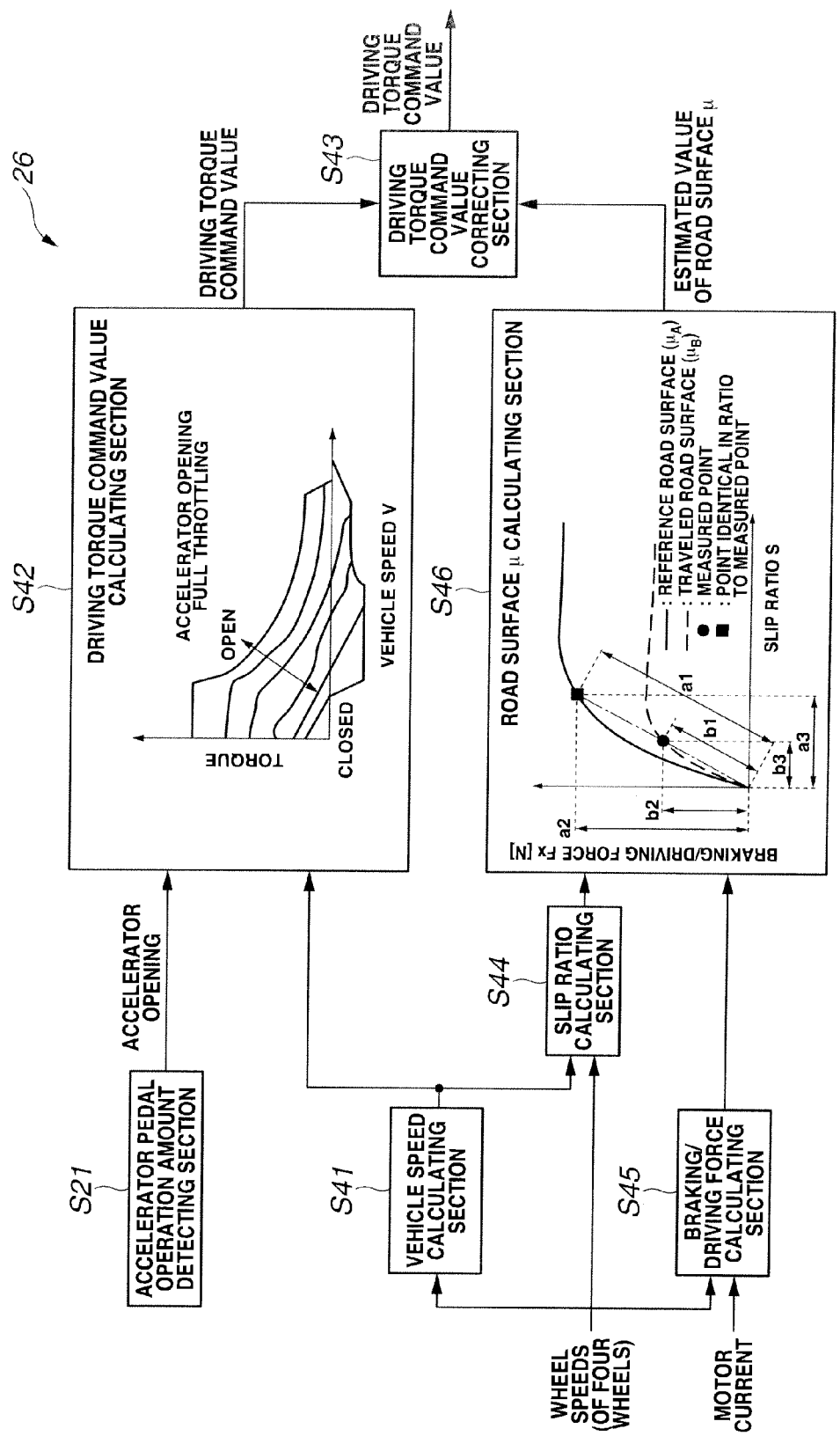
FIG. 18 is a block diagram showing configuration of a system control section of the electric drive vehicle according to the second embodiment.

FIG. 18 shows configuration of system control section 26. As shown in FIG. 18, system control section 26 includes a vehicle speed calculating section 41, a driving torque command value calculating section 42, a driving torque command value correcting section 43, a slip ratio calculating section 44, a braking/driving force calculating section 45, and a road surface μ calculating section 46. System control section 26 implements a vehicle running control device applied with the present invention. Vehicle speed calculating section 41 calculates vehicle speed on the basis of the wheel speeds detected by wheel speed detecting sections $23_{FL}$, $23_{FR}$, $23_{RL}$ and $23_{RR}$. Specifically, vehicle speed calculating section 41 calculates vehicle speed on the basis of an average value between a left non-driving wheel and a right non-driving wheel. The vehicle speed may be estimated in further consideration of a detection value of a longitudinal acceleration sensor. In such a case, vehicle speed calculating section 41 corrects the calculated vehicle speed so as to eliminate the influence of errors due to tire slippage during rapid acceleration or tire locking during rapid braking. The vehicle speed may be detected using a GPS (Global Positioning System), an optical ground speed measuring device, etc. Vehicle speed calculating section 41 outputs the calculated vehicle speed to driving torque command value calculating section 42 and slip ratio calculating section 44.

Driving torque command value calculating section 42 calculates a driving torque command value (driving torque base command value) T on the basis of the accelerator opening detected by accelerator pedal operation amount detecting section 21 and the vehicle speed detected by vehicle speed calculating section 41. The driving torque command value (driving torque base command value) T is a command value corresponding to driver's accelerator operation, and is a value of a current for controlling the driving motors $25_{FL}$ and $25_{FR}$. Driving torque command value calculating section 42 outputs the calculated driving torque command value (driving torque base command value) T to driving torque command value correcting section 43.

Slip ratio calculating section 44 calculates slip ratios on the basis of the wheel speeds detected by wheel speed detecting sections $23_{FL}$, $23_{FR}$, $23_{RL}$ and $23_{RR}$ and the vehicle speed calculated by vehicle speed calculating section 41. Specifically, slip ratio calculating section 44 calculates a slip ratio on the basis of a difference between the vehicle speed and wheel speed. Slip ratio calculating section 44 calculates the slip ratio in different manners during accelerating (during driving) and during decelerating (during braking), as shown in the following equations (1) and (2), respectively.

During accelerating (during driving):

$$S=(V-w)/w \quad (1)$$

During decelerating (during braking):

$$S=(V-w)/V \quad (2)$$

where V represents vehicle speed, and w represents wheel speed.

Slip ratio calculating section 44 outputs the calculated slip ratio to road surface μ calculating section 46.

Braking/driving force calculating section 45 calculates the braking/driving force on the basis of the value of the motor current for driving the driving motors $25_{FL}$ and $25_{FR}$. Specifically, braking/driving force calculating section 45 calculates the braking/driving force on the basis of the motor current value and wheel angular acceleration. Braking/driving force calculating section 45 outputs the calculated braking/driving force to road surface μ calculating section 46. Road surface μ calculating section 46 calculates an estimated value of the road surface μ in a manner similar to road surface μ calculating section 3 in the first embodiment. Namely, road surface μ calculating section 46 stores a characteristic map in a memory or the like, wherein the characteristic map is composed of a tire characteristic curve under condition of a reference road surface. The tire characteristic curve under condition of the reference road surface in the form of the characteristic map is shown in FIG. 10, for example.

As described in the first embodiment, the characteristic map of the tire characteristic curve under condition of the reference road surface is obtained by a running test beforehand. For example, the running test is implemented by a straight jerk running test. The tire characteristic curve under condition of the reference road surface is obtained based on a relationship between change in slip ratio and change in braking/driving force which is obtained by the straight jerk running test under condition of the reference road surface. Alternatively, the characteristic map of the tire characteristic curve under condition of the reference road surface may be obtained by calculation such as simulation instead of the running test.

Road surface μ calculating section 46 estimates a relationship between braking/driving force and slip ratio on the basis of the thus-obtained characteristic map of the tire characteristic curve under condition of the reference road surface. Namely, road surface μ calculating section 46 calculates an estimated value of the road surface μ (or maximum road surface μ) of an actual traveled road surface (refer to description about FIGS. 12 to 16). Road surface μ calculating section 46 outputs the calculated value of the road surface μ to driving torque command value correcting section 43. Driving torque command value correcting section 43 corrects on the basis of the estimated value of road surface μ calculated by road surface μ calculating section 46 the driving torque command value (driving torque base command value) T calculated by driving torque command value calculating section 42. Specifically, driving torque command value correcting section 43 corrects the driving torque command value (driving torque base command value) T so that the corrected driving torque command value decreases as the estimated value of road surface μ decreases (from 1). For example, driving torque command value correcting section 43 corrects the driving torque command value (driving torque base command value) T by a gain depending on the estimated value of road surface μ.

Figure 19:
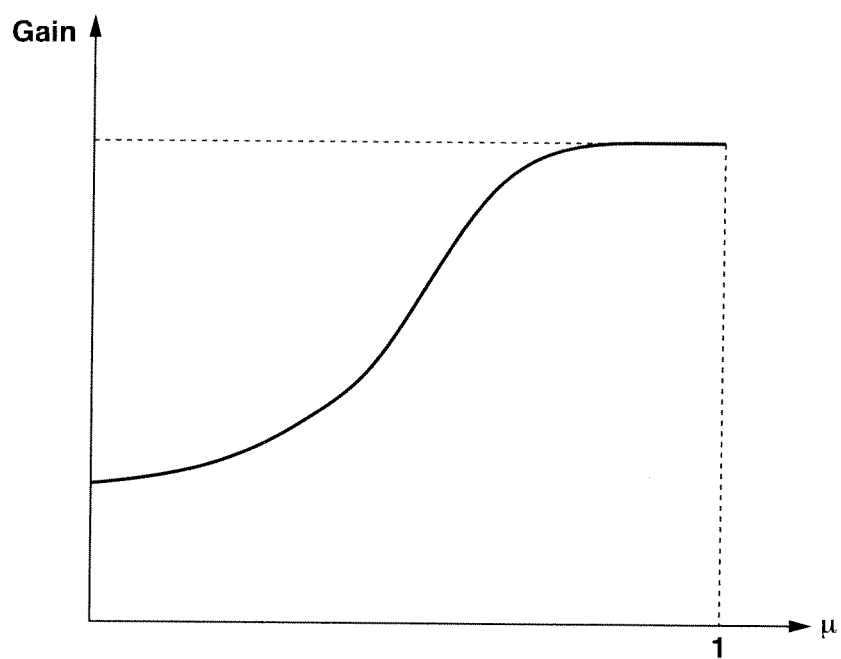
FIG. 19 is a characteristic diagram showing a relationship between road surface μ (estimated value) and a gain "Gain".

FIG. 19 shows a relationship between road surface μ (estimated value) and gain "Gain". As shown in FIG. 19, the gain "Gain" decreases as the road surface μ decreases (from 1). The gain "Gain" defined by this relationship is used to calculate a corrected driving torque command value T (left-hand side) by the following equation (3)

$$T=T-\text{Gain} \cdot L \quad (3)$$

where L represents a gain (>0) for quickly stopping slippage.

According to this equation (3), the driving torque command value T decreases as the estimated value of road surface μ decreases (from 1).

<Operation> Operation is as follows. While the vehicle is traveling, accelerator pedal operation amount detecting section 21 detects the accelerator opening corresponding to accelerator operation by the driver, and vehicle speed calculating section 41 calculates the vehicle speed. Driving torque command value calculating section 42 calculates the driving torque command value (driving torque base command value) T on the basis of the accelerator opening and vehicle speed. On the other hand, wheel speed detecting sections $23_{FL}$, $23_{FR}$, $23_{RL}$ and $23_{RR}$ detect the wheel speeds. Slip ratio calculating section 44 calculates the slip ratio on the basis of the vehicle speed wheel speed. Moreover, braking/driving force calculating section 45 calculates the braking/driving force on the basis of the motor current value. Road surface μ calculating section 46 calculates an estimated value of the road surface μ of an actual traveled road surface on the basis of the braking/driving force, the slip ratio, and the characteristic map. Then, driving torque command value correcting section 43 corrects the driving torque command value (driving torque base command value) T on the basis of the estimated value of road surface μ. Specifically, driving torque command value correcting section 43 corrects the driving torque command value (driving torque base command value) T so that the corrected driving torque command value decreases as the estimated value of road surface μ decreases (from 1).

The second embodiment may be implemented by the following configuration. Specifically, it is possible to limit a maximum driving torque command value according to road surface μ. For example, the maximum driving torque command value is set so that the maximum driving torque command value decreases as the road surface μ decreases. As a result, the driving torque command value T decreases as the estimated value of road surface μ decreases (from 1). The second embodiment is described for the case where the driving torque is corrected. This may be modified so that the braking torque is corrected. In this case, the braking torque is corrected so that a corrected braking torque decreases as the estimated value of road surface μ decreases (from 1).

The second embodiment is described for the case of the motor-driven electric drive vehicle. However, the present invention may be applied to a vehicle based on another driving source, if the vehicle is a vehicle in which the braking/driving force and slip ratio, or physical quantities equivalent to the braking/driving force and slip ratio, can be detected. For example, the present invention may be applied to a gasoline engine drive vehicle. In this case, it is possible to mount an acceleration sensor on the gasoline engine drive vehicle, and estimate the road surface μ on the basis of the vehicle body acceleration detected by the acceleration sensor, wherein the vehicle body acceleration replaces the wheel braking/driving force. In the second embodiment, vehicle running behavior control is described for the case where the braking/driving torque of the vehicle is controlled on the basis of an estimated road surface μ. This may be modified so that another controlled variable for vehicle running control (for example, steering assist torque) is controlled on the basis of an estimated road surface μ.

<Operation and Effect> The second embodiment operates and produces effects as follows.

<1> It detects the braking/driving force and slip ratio of a wheel during traveling, and calculates a ratio between the detected wheel braking/driving force and wheel slip ratio. Then, it estimates a relationship between the braking/driving force and the slip ratio on a basis of the calculated ratio, a tire characteristic curve, and at least one of the detected braking/driving force and slip ratio, wherein the tire characteristic curve is obtained as a correlation between the braking/driving force of the wheel and the slip ratio of the wheel under condition of a reference road surface. Then, it implements vehicle running behavior control by controlling the braking/driving torque of the vehicle on the basis of the relationship between the braking/driving force and slip ratio. This makes it possible to suitably control the braking/driving torque of the vehicle according to the road surface μ of the traveled road surface.

Specifically, it detects the braking/driving force and slip ratio of a wheel during traveling, and calculates a ratio between the detected wheel braking/driving force and wheel slip ratio. Moreover, it determines the braking/driving force of the wheel or the slip ratio of the wheel on a tire characteristic curve, wherein the ratio between the braking/driving force of the wheel and the slip ratio of the wheel is identical to the calculated ratio, and wherein the tire characteristic curve is obtained as a relationship between the braking/driving force of the wheel and the slip ratio of the wheel under condition of a reference road surface. Then, it calculates an actual road surface μ of a traveled road surface on the basis of the ratio between the determined braking/driving force of the wheel and the detected braking/driving force or the ratio between the determined slip ratio and the detected slip ratio, and the road surface μ of the reference road surface. Then, it implements vehicle running behavior control by controlling the braking/driving torque of the vehicle on the basis of the actual road surface μ of the traveled road surface.

This makes it possible to calculate on the basis of the ratio between the braking/driving force and slip ratio the actual road surface μ of the traveled road surface, if the braking/driving force and slip ratio can be detected. Accordingly, it is possible to estimate the road surface μ of the traveled road surface before the occurrence of slippage. This makes it possible to suitably control the braking/driving torque of the vehicle according to the road surface μ of the traveled road surface. For example, it is possible to prevent the occurrence of a loss in braking/driving force due to slippage, and prevent spinning and drifting-out, while the vehicle is turning.

The invention claimed is:

1. A road surface friction coefficient estimating device comprising:
   a braking/driving force detecting section that detects a braking/driving force of a wheel;
   a slip ratio detecting section that detects a slip ratio of the wheel; and
   a road surface friction coefficient estimating section that:
   stores information about a characteristic curve in a coordinate plane, wherein the coordinate plane has a coordinate axis representing the braking/driving force and a coordinate axis representing the slip ratio, and wherein the characteristic curve represents a relationship between the braking/driving force and the slip ratio under a condition of a reference road surface friction coefficient;
   finds with reference to the stored information a point in the coordinate plane at which a straight line intersects with the characteristic curve, wherein the straight line passes through an origin point of the coordinate plane and a detected point, and wherein the detected point corresponds to a detected value of the braking/driving force obtained by the braking/driving force detection section and a detected value of the slip ratio obtained by the slip ratio detecting section; and calculates an estimated value of a road surface friction coefficient, based on a reference value and the detected value of at least one of the braking/driving force and the slip ratio and the reference road surface friction coefficient, wherein the reference value corresponds to the found point.

2. The road surface friction coefficient estimating device as claimed in claim 1, wherein the road surface friction coefficient estimating section:
   calculates a gradient of the straight line in the coordinate plane by dividing the detected value of the braking/driving force by the detected value of the slip ratio; and
   finds the found point based on the gradient.

3. The road surface friction coefficient estimating device as claimed in claim 1, wherein the coordinate plane has a horizontal axis representing the slip ratio and a vertical axis representing the braking/driving force.

4. the road surface friction coefficient estimating device as claimed in clam 1, wherein the origin point of the coordinate plane is a point at which the braking/driving force is equal to zero.

5. The road surface friction coefficient estimating device as claimed in claim 1, wherein the road surface friction coefficient estimating section:
   calculates a ratio to reference based on the reference value and the detected value of at least one of the braking/driving force and the slip ratio; and
   calculates the estimated value of the road surface friction coefficient based on the ratio to reference and the reference road surface friction coefficient.

6. The road surface friction coefficient estimating device as claimed claim 5, wherein the road surface friction coefficient estimating section calculates the ratio to reference by dividing the detected value of the at least one of the braking/driving force and the slip ratio by the reference value of the at least one of the braking/driving force and the slip ratio.

7. The road surface friction coefficient estimating device as claimed in claim 5, wherein the road surface friction coefficient estimating section:
   calculates as a first distance is distance in the coordinate plane between the detected point and a point at which the braking/driving force is equal to zero;
   calculates as a second distance a distance in the coordinate plane between the found point and a point at which the braking/driving force is equal to zero; and
   calculates the ratio to reference based on the first and second distances.

8. The road surface friction coefficient estimating device as claimed in claim 7, wherein the road surface friction coefficient estimating section calculates the ratio to reference by dividing the first distance by the second distance.

9. The road surface friction coefficient estimating device as claimed in claim 1, wherein the road surface friction coefficient estimating section stores information about a second characteristic curve in a second coordinate plane, wherein the second coordinate plane has a horizontal axis representing a ratio of the braking/driving force to the slip ratio and a vertical axis representing the braking/driving force, and wherein the second characteristic curve represents a relationship between the braking/driving force and the slip ratio under a condition of the reference road surface friction coefficient.

10. The road surface friction coefficient estimating device as claimed in claim 9, wherein the road surface friction coefficient estimating section:
    calculates as a ratio to reference a ratio of the detected value of the braking/driving force to the reference value of the braking/driving force with reference to the information about the second characteristic curve; and
    calculates the estimated value of road surface friction coefficient based on the ratio to reference and the reference road surface friction coefficient.

11. The road surface friction coefficient estimating device as claimed in claim 10, wherein the road surface friction coefficient estimating section calculates the ratio to reference by dividing the detected value of the braking/driving force by the reference value of the braking/driving force.

12. The road surface friction coefficient estimating device as claimed in claim 1, wherein the road surface friction coefficient estimating section stores information about a second characteristic curve in a second coordinate plane, wherein the second coordinate plane has a horizontal axis representing a ratio of the braking/driving force to the slip ratio and a vertical axis representing the slip ratio, and wherein the second characteristic curve represents a relationship between the braking/driving force and the slip ratio under a condition of the reference road surface friction coefficient.

13. The road surface friction coefficient estimating device as claimed in claim 12, wherein the road surface friction coefficient estimating section:
    calculates as a ratio to reference a ratio of the detected value of the slip ratio to the reference value of the slip ratio with reference to information about the second characteristic curve; and
    calculates the estimated value of road surface friction coefficient based on the ratio to reference and the reference road surface friction coefficient.

14. The road surface friction coefficient estimating device as claimed in claim 13, wherein the road surface friction coefficient estimating section calculates the ratio to reference by dividing the detected value of the slip ratio by the reference value of the slip ratio.

15. The road surface friction coefficient estimating device as claimed in claim 13, wherein the road surface friction coefficient estimating section calculates the estimated value of the road surface friction coefficient by multiplying the reference road Surface friction coefficient by the ratio to reference.

16. A road surface friction coefficient estimating method comprising:
    detecting, by a system control section, a braking/driving force of a wheel;
    detecting, by the system control section, a slip ratio of the wheel; and
    storing, by the system control section, information about a characteristic curve in a coordinate plane,
    wherein the coordinate plane has a coordinate axis representing the braking/driving force and a coordinate axis representing the slip ratio, and
    wherein the characteristic curve representing a relationship between the braking/driving force and the slip ratio under condition of a reference road surface friction coefficient;
    finding, by the system control section, with reference to the stored information a point in the coordinate plane at which a straight line intersects with the characteristic curve,
    wherein the straight line passes through an origin point of the coordinate plane and a detected point, and
    wherein the detected point corresponds to a detected value of the braking/driving force obtained by the braking/driving force detecting and a detected value of the slip ratio obtained by the slip ratio detecting; and calculating, by the system control section, an estimated value of road surface friction coefficient, based on a reference value and the detected value of at least one of the braking/driving force and the slip ratio, and the reference road surface friction coefficient, wherein the reference value corresponds to the found point.

* * * * *